US012513342B2

(12) United States Patent
Zhang et al.

(10) Patent No.: US 12,513,342 B2
(45) Date of Patent: Dec. 30, 2025

(54) APPARATUS, ARTICLES OF MANUFACTURE, AND METHODS FOR IMPROVED ADAPTIVE LOOP FILTERING IN VIDEO ENCODING

(71) Applicant: Intel Corporation, Santa Clara, CA (US)

(72) Inventors: Ximin Zhang, San Jose, CA (US); Yi-Jen Chiu, San Jose, CA (US); Keith Rowe, Shingle Springs, CA (US)

(73) Assignee: Intel Corporation, Santa Clara, CA (US)

(*) Notice: Subject to any disclaimer, the term of this patent is extended or adjusted under 35 U.S.C. 154(b) by 867 days.

(21) Appl. No.: 17/553,460

(22) Filed: Dec. 16, 2021

(65) Prior Publication Data
US 2022/0109889 A1 Apr. 7, 2022

(51) Int. Cl.
H04N 19/82 (2014.01)
G06N 20/00 (2019.01)
H04N 19/107 (2014.01)
H04N 19/117 (2014.01)
H04N 19/147 (2014.01)

(52) U.S. Cl.
CPC ............. H04N 19/82 (2014.11); G06N 20/00 (2019.01); H04N 19/107 (2014.11); H04N 19/117 (2014.11); H04N 19/147 (2014.11)

(58) Field of Classification Search
CPC .... G06N 20/00; H04N 19/107; H04N 19/117; H04N 19/137; H04N 19/147; H04N 19/176; H04N 19/46; H04N 19/82
USPC .................................................. 375/240.12
See application file for complete search history.

(56) References Cited

U.S. PATENT DOCUMENTS

2020/0404263 A1* 12/2020 Hu .......................... H04N 19/86
2021/0344922 A1    11/2021 Zhang et al.
2021/0344953 A1    11/2021 Filippov et al.
2021/0344964 A1    11/2021 Drugeon et al.
2022/0159249 A1*   5/2022 Taquet ................... H04N 19/70

FOREIGN PATENT DOCUMENTS

WO    2013059461    4/2013

OTHER PUBLICATIONS

Karczewicz et al., "VVC In-Loop Filters," IEEE Transactions on Circuits and Systems for Video Technology, vol. 31, No. 10, Oct. 2021, 19 pages.
Bross et al., "Versatile Video Coding Editorial Refinements on Draft 10," Joint Video Experts Team (JVET) U-T SG 16 WP 3 and ISO/IEC JTC 1/SC 29, 20th Meeting, by teleconference, Oct. 7-16, 2020, 512 pages.

* cited by examiner

Primary Examiner — Christopher S Kelley
Assistant Examiner — Ana Picon-Feliciano
(74) Attorney, Agent, or Firm — Hanley, Flight & Zimmerman, LLC

(57) ABSTRACT

Methods, apparatus, systems, and articles of manufacture are disclosed to improve video encoding. An example apparatus includes at least one memory, instructions, and processor circuitry to at least one of execute or instantiate the instructions to identify a first video frame as a critical video frame with respect to a previous video frame, generate filter coefficients of a video filter based on pixel data of the first video frame or pixel data of a previous critical video frame, and encode the first video frame with the filter coefficients.

22 Claims, 15 Drawing Sheets

APPARATUS, ARTICLES OF MANUFACTURE, AND METHODS FOR IMPROVED ADAPTIVE LOOP FILTERING IN VIDEO ENCODING

FIELD OF THE DISCLOSURE

This disclosure relates generally to video encoding and, more particularly, to apparatus, articles of manufacture, and methods for improved adaptive loop filtering in video encoding.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. Encoding circuitry of a video codec system typically compresses video information so that more information can be sent over a given bandwidth or stored in a given memory space or the like. The compressed signal or data is then decoded by decoder circuitry of a receiving video codec that decodes or decompresses the signal or data for display to a user. In most examples, higher visual quality with greater compression is desirable.

DETAILED DESCRIPTION

Figure 1:
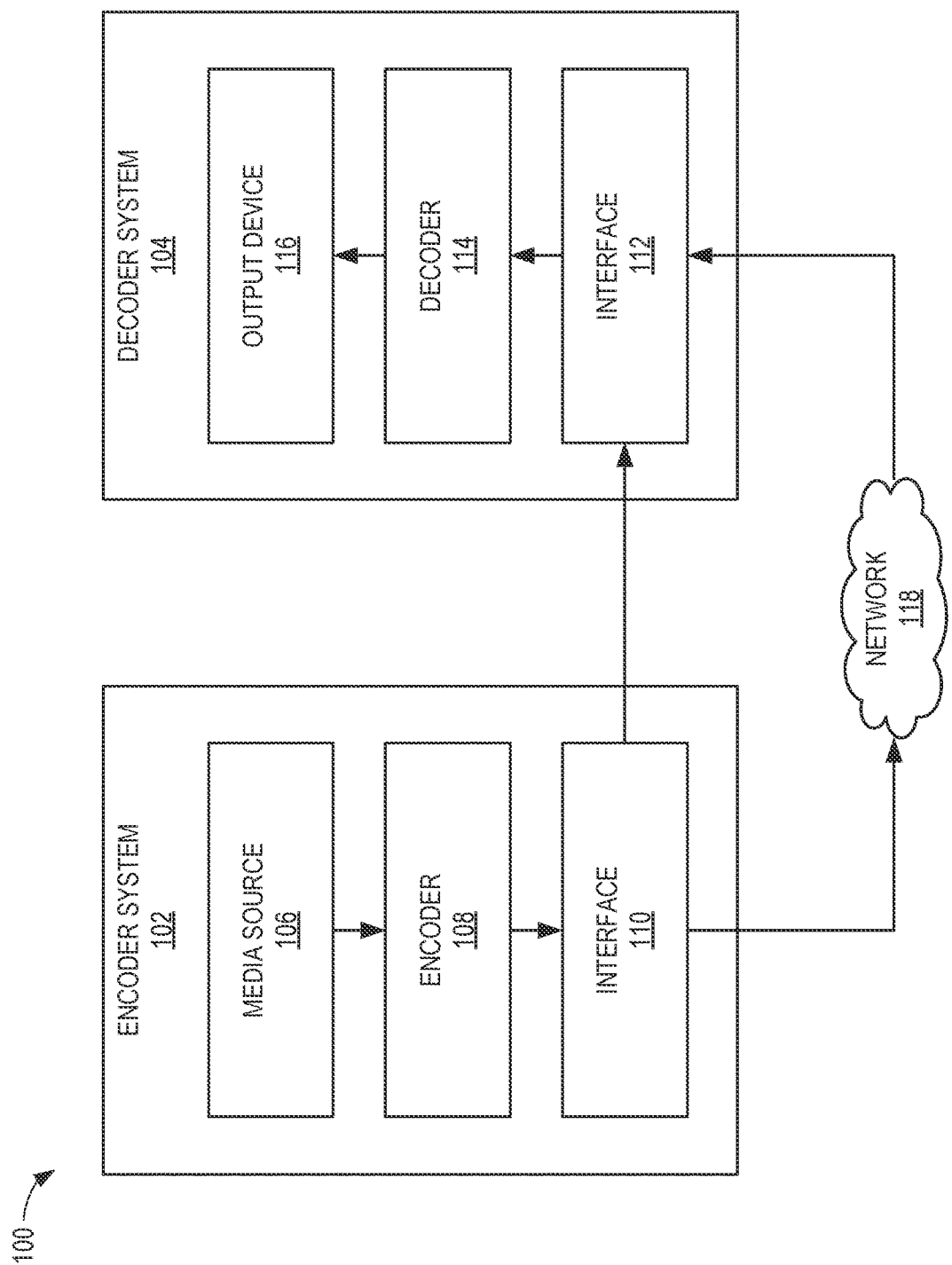
FIG. 1 is an illustration of an example video codec system, which includes an example encoder to compress video information to be provided to an example decoder system.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Video coding (e.g., video encoding and decoding) is incorporated in a wide range of digital video applications, which may include broadcast digital television, digital versatile disks (DVDs) and Blu-ray discs, real-time conversational applications such as video chat and conferencing, video capturing and editing systems, video transmission over internet and mobile networks, and the like. With increasing availability of high-resolution display devices (e.g., a device capable of presenting 4K resolution, 8K resolution, etc.), the amount of video data needed to depict even a relatively short duration video can be substantial, which may result in difficulties when the video data is to be communicated, streamed, transmitted, etc., across a network with limited bandwidth capacity. Generally, the video data is compressed before being transmitted across a network. At a source of the video data, video compression hardware, software, and/or firmware may code the video data prior to storage or transmission to decrease the quantity of video data needed to represent digital video images. At a destination for the video data, video decompression hardware, software, and/or firmware may decode the video data for presentation on a display device.

Some video compression techniques, such as those described in the standards defined by MPEG-2, MPEG-4, ITU-T H.263, ITU-T H.264/MPEG-4, Part 10, Advanced Video Coding (AVC), and High Efficiency Video Coding (HEVC) (H.265), may be utilized to transmit, receive, and store video data (e.g., digital video data or information) with improved efficiency. An evolution of such video compression techniques is Versatile Video Coding (VVC) (H.266). VVC is a video coding standard developed by the Joint Video Experts Team (WET) grouping experts from the ITU-T SG 16/Q.6 Video Coding Experts Group (VCEG) and the ISO/IEC JTC 1/SC 29/WG 11 Moving Pictures Experts Group (MPEG), which had also jointly developed the AVC and HEVC standards. Advantageously, VVC can achieve approximately 50% subject quality improvement with similar bitrates. Advantageously, VVC is designed to meet upcoming video compression/decompression needs.

VVC uses a block-based hybrid coding scheme that includes an encoding/decoding loop and in-loop filters. The filters are defined as "in-loop" because these filtering operations or techniques are applied inside the encoding/decoding loop prior to picture storage in a decoded picture buffer (DPB) (also referred to herein as a decoded frame buffer or a decoded video frame buffer). For example, a video picture or frame may be transformed and quantized for entropy coding. In some such examples, the video picture or frame may be decoded with entropy decoding using context-adaptive binary arithmetic coding (CABAC), and followed by inverse quantization and inverse transform that results in decoded residue. In some examples, the residue is added to a prediction signal (e.g., a spatial (intra picture) prediction signal, a temporal (inter picture) prediction signal, or combination in case of combined intra-inter prediction (CIIP) mode). In some examples, the resulting reconstructed signal is then processed through the in-loop filters to generate a filtered picture or frame. The filtered picture or frame is stored in the DPB.

In VVC, pictures or frames are to be encoded are partitioned into Coding Tree Units (CTUs), which represent the basic coding processing units. In some instances, CTUs may consist of one or more Coding Tree Blocks (CTBs). In some examples, the maximum CTU size is defined by the largest CTB of the CTU (e.g., 128×128 samples, 256×256 samples, etc.). In some examples, a CTU can be recursively divided into CTBs, which can be recursively divided into Coding Units (CUs) according to three partitioning modes: quadtree (e.g., division into four equally sized CUs); ternary-tree (e.g., division into three CUs of size $\frac{1}{4}^{th}$, $\frac{2}{4}^{th}$, $\frac{1}{4}^{th}$); and binary-tree (e.g., division into two equally sized CUs). In some examples, additional partitioning can arise where a CU is split into Transform Units (TUs) of smaller size than the CU size.

In some instances, the quantization, transform, and/or partitioning operations of a block-based hybrid coding scheme, such as that utilized in VVC as described above, may cause, generate, and/or otherwise introduce coding artifacts such as block discontinuities, mosquito noise, ringing artifacts, or texture and edge smoothing. The in-loop filters may be applied in the VVC encoding and decoding loops to reduce these artifacts. In VVC, four different in-loop filters are specified: a Deblocking Filter (DBF) for reducing the blocking artifacts, a Sample Adaptive Offset (SAO) filter for attenuating the ringing artifacts and correcting the local average intensity changes, and Adaptive Loop Filtering (ALF) filters and Cross-Component Adaptive Loop Filtering (CC-ALF) filters for further correcting the video signal based on linear filtering and adaptive clipping.

Generally, a video is a sequence of images (also referred to as frames) that is captured and eventually displayed at a given frequency. In some examples, an image can be obtained by stopping the video at a specific frame of the sequence. In some examples, a picture is the same as a frame. In some examples, such as when an intra-frame coding system is not applied to each individual frame, a picture is different from a frame. For example, a first image to be encoded using an intra-frame coding system can be identified as an intra-coded picture (also referred to as an I-picture). In some such examples, a second image to be encoded using an inter-frame coding system can be identified as an inter-coded frame. For example, an inter-coded frame can be a bidirectional frame (also referred to as a B-frame) or a predicted frame (also referred to as a predicted video frame or P-frame). In some disclosed examples, I-pictures are images that are coded by using information present only in the image itself and without depending on information from other images. P-frames are images that are coded using information corresponding to changes between the image and a previous image (e.g., an I-picture, a previous P-frame, etc.). B-frames are images that are coded using information corresponding to differences between the current image and both the preceding and following images (e.g., a previous and following P-frame, a previous I-picture and a following P-frame, etc.). The order in which the I-image(s), P-frame(s), and B-frame(s) are encoded and/or otherwise arranged is called the group of pictures (GOP).

An image (e.g., a video picture, a video frame, etc.) includes video data, which can include pixel data. Pixel data can include luminance data and/or chrominance data. For example, luminance or luma can represent the brightness in an image. Chrominance or chroma can represent the color in an image. As used herein, the terms "frame," "video frame," "image," "video image," "picture," and "video picture" are interchangeable.

An ALF filter is an adaptive filter that is typically applied to reduce the mean square error (MSE) between an original and reconstructed sample using Wiener-based filtering. For example, an ALF filter can be applied to luma samples and/or chroma samples of a frame. In some examples, an ALF filter includes a luma Wiener filter (e.g., a luma ALF filter), a chroma Wiener filter (e.g., a chroma ALF filter), a CC-ALF filter, and non-linear clipping. In some examples, an ALF filter includes a classification of non-overlapping 4×4 blocks based on their local sample gradients. In some examples, a specific filter for each class can be applied among the different filters signaled in the bitstream output from the encoder. In some examples, based on this classification, geometric transformation (e.g., a 90-degree rotation, diagonal or vertical flip) of coefficients (e.g., filter coefficients) within a filter shape of the filter can be applied.

For each image, the image level filter sets are derived. In response to deriving the filter sets at the image level, a block level decision is made for each CTU (e.g., a decision is made at the block level of the image). In some examples, the luma Wiener filter can be implemented using a 7×7 diamond shape symmetric filter with 13 filter coefficients. Each filter set can have up to 25 filters that respectively correspond to 25 difference classes. In some examples, the chroma Wiener filter can be implemented using a 5×5 diamond shape symmetric filter with 7 filter coefficients and each filter set can have up to 8 filters. In some examples, each filter coefficient in the luma and chroma Wiener filters can have a clipping parameter to be signaled to reduce the excessive filtering impact of neighbor pixels in a frame to be processed.

In some examples, a CC-ALF filter exploits the correlation between the luma and chroma samples and applies only to the chroma samples. For example, a CC-ALF filter can generate a correction of chroma samples using a linearly filtered version of the luma samples located around the same relative location as the chroma samples. In some examples, a CC-ALF filter can be implemented using a 3×4 diamond filter using 8 filter coefficients and each filter set can have up to 4 filters.

The complexity of encoder image level filter derivation and block level decision is substantial due to the numerous candidate filters to be analyzed to identify the final filter decision for an image of interest. In a VVC standard reference encoder, a multiple pass searching technique is applied on every image to derive the image level statistics or parameters and calculate the rate distortion cost of thousands (or more) of candidate filters to find the final filter decision. In some examples, the statistics or parameters can include chroma and/or luma values of pixels (e.g., pixel data of one or more pixels) of the image. The multiple pass searching technique can have increased runtimes compared to prior encoders. Additionally, the complexity introduced by the multiple pass searching technique in VVC is substantially high, not hardware friendly, and difficult to apply any parallel acceleration to reduce runtimes. For example, the multiple pass searching technique may not be hardware friendly and/or otherwise not optimized for hardware processing because hardware may be optimized for single pass searching rather than multiple pass searching.

Examples disclosed herein include systems, apparatus, articles of manufacture, and methods for improved adaptive loop filtering (ALF) in video encoding. Examples disclosed herein reduce complexity and improve efficiency of ALF filters for VVC video encoding. In some disclosed examples, filter derivation at the image level is applied only to a selected image of interest rather than every image. For example, an example encoder as disclosed herein can identify whether an image to be encoded is a critical frame/image/picture. In some disclosed examples, the critical frame is the frame that is needed to derive a new ALF filter instead of reusing ALF filters derived by prior frames. In some disclosed examples, the critical frame is a frame that has a difference with respect to one or more prior frames that satisfies a threshold (e.g., a difference threshold). For example, the frame can be identified as a critical frame because a spatial difference, a temporal difference, an encoding structure distance (e.g., an encoding structure distance position), etc., with respect to a prior frame, such as a prior critical frame, satisfies a respective threshold (e.g., a spatial difference threshold, a temporal difference threshold, an encoding structure distance threshold or simply a distance threshold, etc.).

In some disclosed examples, the critical image is a scene change from a previous image. For example, a scene change can represent a change, switch, transition, etc., between different video clips, a transfer from a first perspective (e.g., a scene in a production studio such as a news room) to a second perspective (e.g., a scene out of the production studio such as a field reporter in an environment), a different camera angle, etc., and/or any combination(s) thereof.

In some disclosed examples, the encoder can identify a critical image based on at least one of content analysis or actual encoding structure. In some disclosed examples, a luma ALF filter can reuse a filter of its prior critical image as a candidate filter, or a possible or potential filter to be applied to an image to be encoded. In some disclosed examples, a chroma ALF filter and/or a CC-ALF filter can use a filter of a prior critical picture as the candidate filter. In some disclosed examples, the chroma ALF filter and/or the CC-ALF filter can be turned off at the image level for improved efficiency.

In some disclosed examples, a latency associated with providing an image to an ALF filter and the ALF filter generating coefficients for a candidate filter can be determined. For example, the encoder can determine whether the latency is greater than a latency threshold and, thus, satisfy the latency threshold. In some disclosed examples, the satisfaction of the latency threshold can be indicative of the latency required to generate the coefficients as too high to meet encoding requirements. In some disclosed examples in which the latency threshold is satisfied (e.g., the latency does not meet the encoding requirements), the encoder can determine the coefficients based on pixel data of a prior encoded image (e.g., an I-picture) to reduce the latency. In some such disclosed examples, the encoder can turn off the chroma ALF filter and the CC-ALF filter for improved efficiency and reduced latency. For example, the encoder can enable the luma ALF filter with default or pre-defined filter selection for each CTU while disabling the chroma ALF filter, CC-ALF filter, and non-linear clipping. Advantageously, in some such disclosed examples, the encoding pipeline would not be slowed down by waiting for determination(s) of pixel data of the current image.

In some disclosed examples in which the latency threshold is not satisfied (e.g., the latency can meet the encoding requirements), the encoder can wait for determination(s) of pixel data of the current image and execute the filter derivation on the pixel data of the current image. Advantageously, in some such disclosed examples, the encoded video signal can be of higher quality compared to an encoded video signal generated by filter derivation on pixel data of a prior encoded image.

FIG. 1 is an illustration of an example video codec system 100, which includes an example encoder system 102 and an example decoder system 104. The encoder system 102 of the illustrated example encodes and/or otherwise compresses video information to be provided to the decoder system 104. In the illustrated example, the encoder system 102 includes an example media source 106, an example encoder 108, and a first example interface 110. In the illustrated example, the decoder system 104 includes a second example interface 112, an example decoder 114, and an example output device 116. In some examples, the first interface 110 and the second interface 112 are directly and/or otherwise directly in communication with each other. In some examples, the first interface 110 and the second interface 112 are communicatively coupled to each other by way of an example network 118.

The media source 106 of the illustrated example corresponds to any one or more media provider(s) capable of providing media for presentation on an output device, such as the output device 116 of the decoder system 104. In some examples, the media provided by the media source 106 can be any type(s) of media, such as audio, video, multimedia, etc. Additionally, the media can correspond to advertisements, live media, streaming media, broadcast media, stored media, on-demand content, etc.

In some examples, the media source 106 can be implemented by (i) an image capturing device of any kind, such as a camera for capturing a real-world image, (ii) an image generating device of any kind, for example a graphics processor for generating a computer animated image, (iii) any other kind of other device for obtaining and/or providing a real-world image, a computer generated image (e.g., a screen content, a virtual reality (VR) image), and/or (iv) any combination(s) thereof (e.g., an augmented reality (AR) image). In some examples, the media source 106 can be implemented by any kind and/or quantity of memory or mass storage device for storing any of the aforementioned images.

The encoder 108 of the illustrated example can be implemented by hardware, software, and/or firmware to encode and/or otherwise output encoded video data. For example, the encoder 108 can be implemented using processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). In some examples, the encoder 108 can receive video data (e.g., video including one or more images) from the media source 106 and carry out pre-processing on the video data to generate pre-processed video data. For example, the encoder 108 can execute color format conversion (e.g., from RGB color format to YCbCr color format), color correction, de-noising, and/or trimming on the video data. In some examples, the encoder 108 can encode video data from the media source 106 (e.g., the pre-processed video data) using VVC. For example, the encoder 108 can process (e.g., by compression) original media images from the media source 106 to reduce the amount of data required for representing the video images (e.g., for more efficient storage and/or transmission) by utilizing VVC.

The first interface 110 of the illustrated example can be implemented by hardware, software, and/or firmware to receive encoded video data from the encoder 108 and to transmit the encoded video data to the second interface 112 (e.g., either directly or by way of the network 118). The second interface 112 of the illustrated example can be implemented by hardware, software, and/or firmware to receive encoded video data from the first interface 110 and provide the encoded video data to the decoder 114.

In some examples, the first interface 110 and/or the second interface 112 obtain information from and/or transmit information to the network 118. In the illustrated example, the first interface 110 can implement a server (e.g., a web server) that transmits encoded video data to the second interface 112. In the illustrated example, the second interface 112 can implement a server (e.g., a web server) that receives the encoded video data from the first interface 110. In the illustrated example, the encoded video data is formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In some examples, the first interface 110 and/or the second interface 112 can be implemented using processor circuitry, analog circuit(s), digital circuit(s), logic circuit(s), programmable processor(s), programmable microcontroller(s), GPU(s), DSP(s), ASIC(s), PLD(s), and/or FPLD(s). In some examples, the first interface 110 and/or the second interface 112 can be implemented using interface circuitry. For example, the interface circuitry can be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In some examples, the first interface 110 and/or the second interface 112 can be implemented using a communication device such as a transmitter, a receiver, a transceiver, a modem, a residential gateway, a wireless access point, and/or a network interface to facilitate exchange of data with external machines (e.g., computing devices of any kind) by the network 118. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The network 118 of the illustrated example is the Internet. However, the network 118 can be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The network 118 enables the first interface 110, and/or, more generally, the encoder system 102, to be in communication with the second interface 112, and/or, more generally, the decoder system 104.

The decoder 114 of the illustrated example can be implemented by hardware, software, and/or firmware to receive and decode encoded video data to provide decoded video data to the output device 116. For example, the decoder 114 can be implemented using processor circuitry, analog circuit(s), digital circuit(s), logic circuit(s), programmable processor(s), programmable microcontroller(s), GPU(s), DSP(s), ASIC(s), PLD(s), and/or FPLD(s). In some examples, the decoder 114 can decode encoded video data using VVC. In some examples, the decoder 114 can post-process the decoded video data (also referred to herein as reconstructed video data). For example, the decoder 114 can perform post-processing operations such as color format conversion (e.g., from YCbCr color format to RGB color format), color correction, re-sampling, trimming, etc., or any other type of processing the decoded video data for display, presentation, etc., by the output device 116.

The output device 116 of the illustrated example can be implemented by hardware, software, and/or firmware to receive the decoded video data (e.g., the post-processed decoded video data) for displaying and/or otherwise presenting the video (e.g., to a user or viewer). In some examples, the output device 116 can be one or more display devices of any kind, such as an integrated or external display for representing the decoded video data. In some examples, the output device 116 can be implemented using one or more liquid crystal displays (LCDs), organic light emitting diode (OLED) displays, plasma displays, projectors, micro light emitting diode (LED) displays, liquid crystal on silicon (LCoS) displays, digital light processor (DLP) displays, or any other kind of display or output device.

Although the illustrated example of FIG. 1 depicts the encoder system 102 and the decoder system 104 as separate devices, examples of devices and/or systems described herein may also include both or both functionalities (e.g., the encoder system 102 or corresponding functionality and the decoder system 104 or corresponding functionality). In some examples, the encoder system 102 or corresponding functionality and the decoder system 104 or corresponding functionality may be implemented using the same hardware, software, and/or firmware or by separate hardware, software, and/or firmware or any combination thereof.

In some examples, the encoder system 102 and the decoder system 104 may be implemented using any of a wide range of devices, including any kind of handheld or stationary devices, such as notebook or laptop computers, mobile phones, smart phones, tablets or tablet computers, cameras, desktop computers, set-top boxes, televisions, display devices, digital media players, video gaming consoles, video streaming devices (e.g., content services servers or content delivery servers), broadcast receiver devices, broadcast transmitter devices, or the like and may use no operating system or any kind of operating system. In some examples, the encoder system 102 and the decoder system 104 may be configured and/or otherwise equipped for wireless communication. For example, the encoder system 102 and the decoder system 104 can be wireless communication devices.

In some examples, the video codec system 100 is merely an example and the techniques described herein may apply to video coding settings (e.g., video encoding or video decoding) that do not necessarily include any data communication between the encoder 108 (or encoder system 102) and the decoder 114 (or decoder system 104). In some examples, data (e.g., video data) is retrieved from a local memory (or local mass storage device), streamed over the network 118, or the like. For example, the encoder 108 can encode and store data to memory (or mass storage device), and/or the decoder 114 can retrieve and decode data from the memory (or the mass storage device). In some examples, the encoding and decoding is performed by devices that do not communicate with one another, but simply encode data to memory (or mass storage device) and/or retrieve and decode data from the memory (or the mass storage device).

Figure 2:
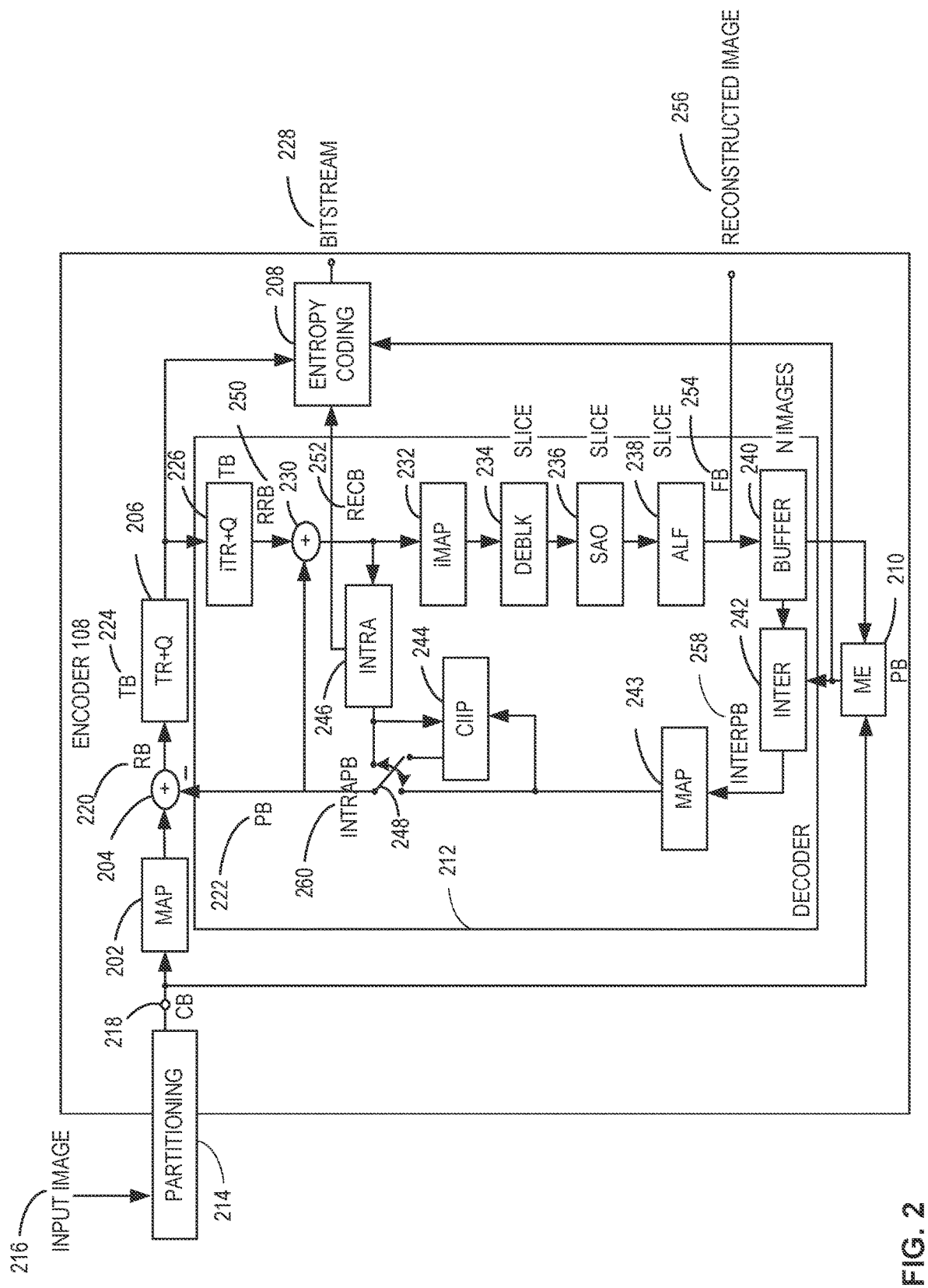
FIG. 2 is a block diagram of an example implementation of the encoder of FIG. 1, which includes an example adaptive loop filter.

FIG. 2 is a block diagram of an example implementation of the encoder 108 of FIG. 1. In some examples, the encoder 108 can implement a VVC encoder. The encoder 108 of the illustrated example of FIG. 2 includes a first example map block 202, an example residual calculation block 204, an example transform and quantization block 206 (identified by TR+Q), an example entropy coding block 208, an example motion estimation block 210 (identified by ME), and an example decoder 212. In example operation, the encoder 108 performs encoding (e.g., VVC encoding) by predicting the next frame and sending corrections of the next frame with the next frame. In the illustrated example, the encoder 108 includes the decoder 212 to determine what is decoded and understand the differences between an input (e.g., a frame to be encoded) and output (e.g., an encoded frame) of the encoder 108. In the illustrated example, the encoder 108 generates the corrections of the next frame based on the differences between the input and the output of the encoder 108.

An example partitioning block 214 is coupled to the first map block 202. In some examples, the partitioning block 214 executes high-level partitioning of an example input image 216 into subimages, slices, tiles, etc. In some examples, the partitioning block 214 executes block partitioning of pixels of the subimages, the slices, the tiles, etc., into Coding Tree Units (CTUs) (e.g., a CTU up to 128×128 pixels, 256×256 pixels, etc.) and Coding Units through a multi-type tree (MTT) (e.g., a quad-tree, a vertical or horizontal ternary-tree, a vertical or horizontal binary-tree, etc.). In some examples, the partitioning block 214 can separate trees for luma and chroma components.

In example operation, the partitioning block 214 receives the input image 216 and partitions the input image 216 into one or more example coding blocks such as an example coding block 218 (identified by CB) depicted in FIG. 2. For example, the partitioning block 214 can receive the input image 216 from the media source 106 of FIG. 1. As used herein, the term "block" may be a portion, in particular a square or rectangular portion, of an image (e.g., a picture). With reference, for example, to VVC, the block may be or correspond to a coding tree unit (CTU), a coding unit (CU), a prediction unit (PU), and transform unit (TU) and/or to the corresponding blocks, e.g. a coding tree block (CTB), a coding block (CB), a transform block (TB) or prediction block (PB). Correspondingly, a CTB may be an N×N block of samples for some value of N such that the division of a component into CTBs is a partitioning. A CU may be or include a coding block of luma samples, two corresponding coding blocks of chroma samples of an image that has three sample arrays, or a coding block of samples of a monochrome image or an image that is coded using three separate color planes and syntax structures used to code the samples. Correspondingly a CB may be an M×N block of samples for some values of M and N such that the division of a CTB into coding blocks is a partitioning.

In some examples, such as those according to VVC, a combined quad-tree and binary tree (QTBT) partitioning is for example used to partition a coding block, such as the coding block 218 depicted in FIG. 2. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called CUs, and that segmentation is used for prediction and transform processing without any further partitioning. This means that the CU, PU, and TU have the same block size in the QTBT coding block structure. In parallel, multiple partition, for example, triple tree partition may be used together with the QTBT block structure.

The first map block 202 can perform luma mapping on the coding block 218. For example, the first map block 202 can remap the luma code values of the coding block 218. In some examples, the first map block 202 can execute chroma scaling to allow flexible adjustment between luma and chroma signals. The residual calculation block 204 determines an example residual block 220 (identified by RB) (also referred to as residue, residual, or a residual value) based on the coding block 218 and an example prediction block 222 (identified by PB), which is output from the decoder 212. For example, the residual calculation block 204 can determine the residual block 220 based on a difference between sample values of the coding block 218 and sample values of the prediction block 222 on a sample by sample basis (e.g., a pixel by pixel basis) to obtain the residual block 220 in the sample domain.

The transform and quantization block 206 can receive the residual block 220 (or the coding block 218) and generate an example transform block 224 (identified by TB). For example, the transform and quantization block 206 can apply a transform (e.g., a discrete cosine transform (DCT), a discrete sine transform (DST), etc.) on the sample values of the residual block 220 to obtain transform coefficients in the transform domain. The transform coefficients may also be referred to as transform residual coefficients and represent the residual block 220 in the transform domain.

In some examples, the transform and quantization block 206 can be configured to apply integer approximations of DCT/DST, such as the transforms specified for VVC. In some examples, compared to an orthogonal DCT transform, such integer approximations are typically scaled by a certain factor. For example, to preserve the norm of the residual block 220, which is processed by forward and inverse transforms, additional scaling factors can be applied as part of the transform process. In some examples, the scaling factors can be chosen based on certain constraints like scaling factors being a power of two for shift operations, bit depth of the transform coefficients, tradeoff between accuracy and implementation costs, etc. Specific scaling factors are, for example, specified for the inverse transform (e.g., by inverse transform and quantization block 226) and corresponding scaling factors for the forward transform (e.g., by the transform and quantization block 206) can be specified accordingly.

In some examples, the transform and quantization block 206 can be configured to output transform parameters. For example, the transform parameters can define, indicate, represent, etc., a type of transform or transforms. In some examples, the transform and quantization block 206 can provide the transform parameters directly to a decoder (e.g., the decoder 114 of FIG. 1). In some examples, the transform and quantization block 206 can provide the transform parameters to be encoded or compressed via the entropy coding block 208 so that the decoder can receive and use the transform parameters for decoding.

In some examples, the transform and quantization block 206 can be configured to quantize the transform coefficients to obtain quantized coefficients. For example, the transform and quantization block 206 can quantize the transform coefficients by applying scalar quantization or vector quantization. The quantized coefficients may also be referred to as quantized transform coefficients or quantized residual coefficients.

The entropy encoding block 208 can be configured to apply, for example, an entropy encoding algorithm or scheme (e.g., a variable length coding (VLC) scheme, a context adaptive VLC (CAVLC) scheme, an arithmetic coding scheme, a binarization, context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients, inter prediction parameters, intra prediction parameters, loop filter parameters, and/or other syntax elements to obtain encoded image data, which can be output from the entropy coding block 208 in the form of an example bitstream 228 (e.g., an encoded bitstream), so that, e.g., the decoder 114 of FIG. 1, can receive and use the parameters for decoding. The bitstream 228 can be transmitted to a decoder, such as the decoder 114 of FIG. 1, or stored in memory for later transmission or retrieval by the decoder.

The decoder 212 of the illustrated example generates the prediction block 222 based on the transform block 224 to correct coding artifacts such as block discontinuities, mosquito noise, ringing artifacts, or texture and edge smoothing. The decoder 212 of the illustrated example includes the inverse transform and quantization block 226 (identified by iTR+iQ), an example reconstruction block 230, an example inverse map block 232 (identified by iMap), an example deblocking filter 234 (identified by DEBLK), an example Sample Adaptive Offset (SAO) filter 236 (identified by SAO), an example Adaptive Loop Filtering (ALF) filter 238 (identified by ALF), an example buffer 240, an example inter prediction mode block 242 (identified by INTER), a second example map block 243 (identified by MAP), an example Combined Inter and Intra Prediction (CIIP) mode block 244 (identified by CIIP), an example intra prediction mode block 246 (identified by INTRA), and an example switch 248.

The inverse transform and quantization block 226 can be configured to apply the inverse quantization of the transform and quantization block 206. For example, the inverse transform and quantization block 226 can apply the inverse quantization on the quantized coefficients from the transform and quantization block 206 to generate dequantized coefficients. In some examples, the inverse transform and quantization block 226 can generate the dequantized coefficients by applying the inverse quantization scheme applied by the transform and quantization block 206 based on or using the same quantization step size as the transform and quantization block 206. For example, the inverse transform and quantization block 226 can execute inverse quantization by multiplying quantized coefficients from the transform and quantization block 206 by a quantization step size. The dequantized coefficients may also be referred to as dequantized residual coefficients. In some examples, the dequantized coefficients can correspond to the transform coefficients but may not be identical due to the loss by quantization.

The inverse transform and quantization block 226 can be configured to apply the inverse transform of the transform applied by the transform and quantization block 206. For example, the inverse transform and quantization block 226 can perform an inverse DCT, an inverse DST, or other inverse transform to generate an example reconstructed residual block 250 (identified by RRB) (or corresponding dequantized coefficients) in the sample domain. The reconstructed residual block 250 may also be referred to as a transform block.

The reconstruction block 230 can be implemented by an adder or summer to add the reconstructed residual block 250 to the prediction block 222 to obtain an example reconstructed block 252 (identified by RECB) in the sample domain. For example, the reconstruction block 230 can add (e.g., add sample-by-sample) the sample values of the reconstructed residual block 250 and the sample values of the prediction block 222 to yield the reconstructed block 252.

The inverse map block 232 can perform an inverse luma mapping of the reconstructed block 252 and output the result to the deblocking filter 234. In the illustrated example, the deblocking filter 234, the SAO filter 236, and/or the ALF filter 238 can be configured to filter the reconstructed block 252 to generate an example filtered block 254 (identified by FB). In some examples, the filtered block 254 can implement an example reconstructed image 256. The deblocking filter 234 can reduce blocking artifacts in a slice of the reconstructed block 252. The SAO filter 236 can filter for attenuating the ringing artifacts and correcting the local average intensity changes. The ALF filter 238, which can be implemented by a luma ALF filter, a chroma ALF filter, and/or a CC-ALF filter, can further correct the video signal based on linear filtering and adaptive clipping. The ALF filter 238 can generate and/or otherwise output the filtered block 254, the reconstructed image 256, etc., which can be provided to the buffer 240. In some examples, the ALF filter 238 can generate and/or otherwise output loop filter parameters (e.g., a filter index, filter coefficients, etc.) either directly to a decoder, such as the decoder 114 of FIG. 1, or to the entropy coding block 208 for insertion into the bitstream 228.

The buffer 240 of the illustrated example is a decoded image buffer. In some examples, the buffer 240 may be referred to as a decoded picture buffer (DPB). In some examples, the buffer 240 can be implemented using memory, one or more mass storage devices, etc., that store(s) reference images, and/or, more generally, reference image data, for encoding video data by the encoder 108. For example, the buffer 240 can be configured to store one or more of the filtered blocks 254. In some examples, the buffer 240 can be adapted to store other previously filtered blocks, such as previously reconstructed and filtered blocks, of the same current image or of different images, such as previously reconstructed images. In some examples, the buffer 240 can provide complete previously reconstructed (e.g., decoded) images (and corresponding reference blocks and samples) and/or a partially reconstructed current image (and corresponding reference blocks and samples) to the inter prediction mode block 242 for inter prediction.

The motion estimation block 210 of the illustrated example can be configured to receive or obtain the coding block 218 from the partitioning block 214 and receive or obtain an image, such as the filtered block 254, from the buffer 240. The motion estimation block 210 can perform motion estimation of images in a video sequence, such as the current image and a previously decoded image. For example, the motion estimation block 210 can select a reference block from a plurality of reference blocks of the same or different images of the plurality of other images and provide a reference image (or reference image index) and/or an offset (spatial offset) between the position (x, y coordinates) of the reference block and the position of the current block as inter prediction parameters to the inter prediction mode block 242. The offset may be referred to as a motion vector.

The inter prediction mode block 242 of the illustrated example can be configured to receive or obtain an inter prediction parameter from the motion estimation block 210 and to perform inter prediction based on or using the inter prediction parameter to generate an example inter prediction block 258 (identified by INTERPB). For example, the inter prediction mode block 242 can perform inter prediction by creating a prediction model from one or more previously encoded images, frames, etc. In some examples, inter prediction can exploit temporal redundancy, such as correlation among pixels between neighboring images, by calculating prediction values through extrapolation from already coded pixels for effective delta coding. The second map block 243 can be configured to receive the inter prediction block 258 and perform luma mapping on the inter prediction block 258. The second map block 243 can output the inter prediction block 258 to the CIIP mode block 244 and the switch 248.

The intra prediction mode block 246 can be configured to use reconstructed samples of neighboring blocks of the same current image to generate an example intra prediction block 260 (identified by INTRAPB). For example, the intra prediction mode block 246 can perform intra prediction by creating a prediction model from pixels within an image, a frame, etc. In some examples, intra prediction can exploit spatial redundancy, such as correlation among pixels within one frame, by calculating prediction values through extrapolation from already coded pixels for effective delta coding. In some examples, the intra prediction mode block 246 can be adapted to output intra prediction parameters to the entropy coding block 208 for inclusion into the bitstream 228 so that a decoder, such as the decoder 114, can receive and use the intra prediction parameters for decoding.

In some examples, the decoder 212 can be configured to operate using inter prediction (e.g., operate in an inter prediction mode), intra prediction (e.g., operate in an intra prediction mode), or a combination thereof. For example, in response to configuring the decoder 212 to use inter prediction, the decoder 212 can control the switch 248 to couple an output of the second map block 243 to the residual calculation block 204 through the switch 248. In some such examples, the inter prediction block 258 output from the second map block 243 can implement the prediction block 222.

In some examples, in response to configuring the decoder 212 to use intra prediction, the decoder 212 can control the switch 248 to couple an output of the intra prediction mode block 246 to the residual calculation block 204 through the switch 248. In some such examples, the intra prediction block 260 can implement the prediction block 222.

In some examples, in response to configuring the decoder 212 to use CIIP mode, the decoder 212 can control the switch 248 to couple an output of the CIIP mode block 244 to the residual calculation block 204 through the switch 248. In some such examples, the output of the CIIP mode block 244 can implement the prediction block 222.

In some examples, the partitioning block 214, the first map block 202, the residual calculation block 204, the transform and quantization block 206, the entropy coding block 208, and/or the motion estimation block 210 can be implemented by hardware alone or by hardware in combination with software and/or firmware. Thus, for example, any of the partitioning block 214, the first map block 202, the residual calculation block 204, the transform and quantization block 206, the entropy coding block 208, and/or the motion estimation block 210 could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s).

In some examples, the inverse transform and quantization block 226, the reconstruction block 230, the inverse map block 232, the deblocking filter 234, the SAO filter 236, the ALF filter 238, the buffer 240, the inter prediction mode block 242, the second map block 243, the CIIP mode block 244, the intra prediction mode block 246, and/or the switch 248 can be implemented by hardware alone or by hardware in combination with software and/or firmware. Thus, for example, any of the inverse transform and quantization block 226, the reconstruction block 230, the inverse map block 232, the deblocking filter 234, the SAO filter 236, the ALF filter 238, the buffer 240, the inter prediction mode block 242, the second map block 243, the CIIP mode block 244, the intra prediction mode block 246, and/or the switch 248 could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s).

Figure 3:
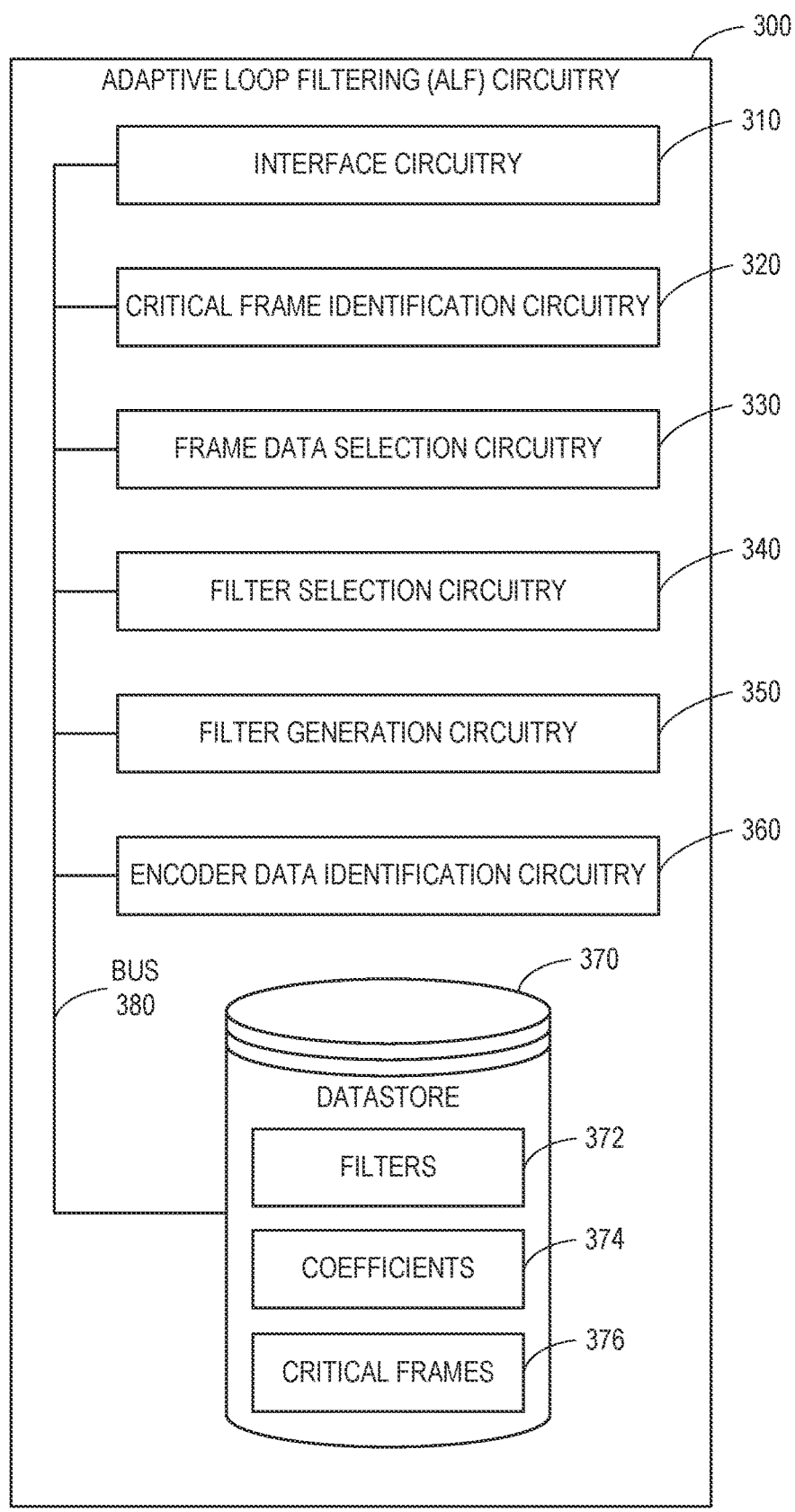
FIG. 3 is a block diagram of an example implementation of the adaptive loop filter of FIG. 2.

FIG. 3 is a block diagram of example adaptive loop filtering (ALF) circuitry 300 to filter a reconstructed block to smooth pixel transitions, or otherwise improve video quality. In some examples, the ALF circuitry 300 can implement the ALF filter 238 of FIG. 2. The ALF circuitry 300 of FIG. 3 may be instantiated (e.g., creating an instance of, bring into being for any length of time, materialize, implement, etc.) by processor circuitry such as a central processing unit executing instructions. Additionally or alternatively, the ALF circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the ALF circuitry 300 of FIG. 3 may, thus, be instantiated at the same or different times. Some or all of the circuitry may be instantiated, for example, in one or more threads executing concurrently on hardware and/or in series on hardware. Moreover, in some examples, some or all of the ALF circuitry 300 of FIG. 3 may be implemented by one or more virtual machines and/or containers executing on the microprocessor.

The ALF circuitry 300 of the illustrated example includes example interface circuitry 310, example critical frame identification circuitry 320, example frame data selection circuitry 330, example filter selection circuitry 340, example filter generation circuitry 350, example encoder data identification circuitry 360, an example datastore 370, and an example bus 380. The datastore 370 of the illustrated example includes example filters 372, example coefficients 374 (e.g., filter coefficients), and example critical frames 376.

In the illustrated example of FIG. 3, the interface circuitry 310, the critical frame identification circuitry 320, the frame data selection circuitry 330, the filter selection circuitry 340, the filter generation circuitry 350, the encoder data identification circuitry 360, and the datastore 370, are in communication with one(s) of each other via the bus 380. For example, the bus 380 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 380 can be implemented by any other type of computing or electrical bus.

The ALF circuitry 300 of the illustrated example includes the interface circuitry 310 to receive a video frame including pixel data. For example, the interface circuitry 310 can receive a slice of a video frame from the SAO filter 236 of FIG. 2. In some examples, the slice of the video frame can include pixel data, which can include luma and/or chroma values of one or more pixels of the slice of the video frame. In some examples, the interface circuitry 310 can determine whether another video frame has been received to process.

The ALF circuitry 300 of the illustrated example includes the critical frame identification circuitry 320 to identify a video frame as a critical frame or critical video frame. In some examples, the critical frame identification circuitry 320 can determine that the video frame is a critical frame because it is and/or otherwise represents a substantial change from a previous video frame. For example, the critical frame identification circuitry 320 can determine that the video frame is a critical video frame representative of a difference between the video frame and a prior video frame. In some such examples, the substantial change can be representative of and/or otherwise indicative of a scene change. For example, a critical frame can represent a switch between different video clips, a transfer from a first perspective (e.g., a scene in a production studio such as a news room) to a second perspective (e.g., a scene out of the production studio such as a field reporter in an environment), a different camera angle, etc., and/or any combination(s) thereof.

In some examples, the critical frame identification circuitry 320 can identify a critical frame (e.g., a scene change video frame) based on temporal correlation analysis and/or encoding structure. In some examples, the critical frame identification circuitry 320 can store the critical frame (and/or corresponding pixel data such as chroma values and/or luma values) as one of the critical frames 376 in the datastore 370. For example, the critical frame identification circuitry 320 can perform temporal correlation analysis to measure a temporal correlation difference between a received video frame and a prior or previous frame that is identified as a critical frame. In some examples, the critical frame identification circuitry 320 can determine whether a temporal correlation difference satisfies a threshold. In some examples, if the critical frame identification circuitry 320 determines that the temporal correlation difference satisfies a threshold, then the critical frame identification circuitry 320 can identify the video frame as a critical frame.

In some examples, if the critical frame identification circuitry 320 determines that the temporal correlation difference does not satisfy a threshold, then the critical frame identification circuitry 320 can determine a critical frame based on its position in an encoding structure (e.g., a position of a video frame in a group of pictures (GOP), a group of frames, etc.). For example, the critical frame identification circuitry 320 can utilize the temporal difference to determine a recommended distance between a previously identified critical frame and the next potential critical frame. In some such examples, the critical frame identification circuitry 320 can determine that the smaller the temporal difference, then the larger the distance between a position of the previously identified critical frame and a position of the next potential critical frame. In some such examples, the critical frame identification circuitry 320 can determine that the larger the temporal difference, then the smaller the distance between a position of the previously identified critical frame and a position of the next potential critical frame.

In some examples, the critical frame identification circuitry 320 can determine a position in an encoding structure (e.g., a GOP) at which a critical frame is to be inserted based on the recommended distance. In some such examples, the critical frame identification circuitry 320 can determine whether a current position of a video frame to be encoded is the same as the position in the GOP at which the critical frame is to be inserted. In some examples, if the critical frame identification circuitry 320 determines that the current position of the video frame to be encoded is the same as the position in the GOP at which the critical frame is to be inserted, then the critical frame identification circuitry 320 can identify the video frame as a critical frame. In some examples, if the critical frame identification circuitry 320 determines that the current position of the video frame to be encoded is not the same as the position in the GOP at which the critical frame is to be inserted, then the critical frame identification circuitry 320 can identify the video frame as a non-critical frame.

In some examples, the critical frame identification circuitry 320 can identify a frame as a critical frame based on whether a distance from the frame to a previous or prior critical frame satisfies a threshold. For example, the frame can have a distance of 7 from the prior critical frame, which can satisfy a threshold (e.g., a distance threshold) of 6 because the distance of 7 is greater than the threshold of 6. In some examples, the frame can have a distance of 7 from the prior critical frame, which can satisfy a threshold (e.g., a distance threshold) of 7 because the distance of 7 is greater than or equal to the threshold of 6. In some examples, if the critical frame identification circuitry 320 determines that the distance of the frame to the prior critical frame satisfies a threshold, then the critical frame identification circuitry 320 can identify the frame as a critical frame. In some examples, the critical frame identification circuitry 320 can identify a frame as a critical frame based on at least one of temporal analysis, a position in an encoding structure, or distance (e.g., a distance of the frame with respect to a prior critical frame).

In some examples, if the critical frame identification circuitry 320 determines that the temporal correlation difference does not satisfy a threshold, then the critical frame identification circuitry 320 can determine a critical frame based on its position in an encoding structure (e.g., a position of a video frame in a group of pictures (GOP), a group of frames, etc.). For example, the critical frame identification circuitry 320 can utilize the temporal difference to determine a recommended distance between a previously identified critical frame and the next potential critical frame. In some such examples, the critical frame identification circuitry 320 can determine that the smaller the temporal difference, then the larger the distance between a position of the previously identified critical frame and a position of the next potential critical frame. In some such examples, the critical frame identification circuitry 320 can determine that the larger the temporal difference, then the smaller the distance between a position of the previously identified critical frame and a position of the next potential critical frame.

Advantageously, in some examples, the filter generation circuitry 350 as described below may derive new filters only on critical frames. In some such examples, ALF related adaptation parameter sets (e.g., filter parameters for a luma ALF filter, a chroma ALF filter, a CC-ALF filter, etc.) may only be encoded for the critical frames. For example, in some prior VVC encoders, ALF related adaptation parameter sets may be encoded for every frame. Advantageously, in some examples, by only encoding ALF related adaptation parameter sets (e.g., adaptation parameter set data structures) for critical frames (rather than for every frame), then syntax overhead when storing and/or transmitting encoded video data is substantially reduced. Advantageously, the reduced syntax overhead can improve an efficiency of storing and/or transmitting encoded video data in association with a network with limited bandwidth capacity.

In some examples, chroma ALF and CC-ALF can be turned off and/or otherwise disabled for non-critical frames. For example, in some prior VVC encoders, chroma ALF and CC-ALF related adaptation parameter sets may be encoded for every frame. Advantageously, in some examples, by only encoding chroma ALF and CC-ALF related adaptation parameter sets for critical frames (rather than for every frame), then syntax overhead when storing and/or transmitting encoded video data is substantially reduced. Advantageously, the reduced syntax overhead can improve an efficiency of storing and/or transmitting encoded video data in association with a network with limited bandwidth capacity.

The ALF circuitry 300 of the illustrated example includes the frame data selection circuitry 330 to select data associated with a frame to be used to generate filter coefficients (e.g., ALF coefficients such as luma ALF, chroma ALF, CC-ALF, etc., coefficients). In some examples, the frame data selection circuitry 330 may implement a hardware optimized ALF filter by effectuating a single or one-pass technique to derive a new filter. For example, the frame data selection circuitry 330 can effectuate the one-pass technique by deriving a new filter using pixel data from a prior frame. In some examples, the frame data selection circuitry 330 may implement a multi-pass technique to derive a new filter. For example, the frame data selection circuitry 330 can effectuate the multi-pass technique by deriving a new filter using pixel data of a current frame. In some such examples, utilizing pixel data of the current frame may result in a higher quality encoded video frame but may have greater latency or increased runtime with respect to the one-pass technique to encode the video frame.

In some examples, the frame data selection circuitry 330 can determine whether to select frame data from a prior frame or a current frame based on a value of a parameter, such as a latency parameter or a runtime parameter. For example, the frame data selection circuitry 330 can determine a latency associated with generating filter coefficients using the multi-pass technique. If, the frame data selection circuitry 330 determines that the latency is greater than a threshold, such as a latency threshold, then the threshold is satisfied, which is representative of the ALF circuitry 300 not meeting encoding requirements (e.g., a latency requirement, a runtime requirement, etc.). If the frame data selection circuitry 330 determines that the encoding requirements are not met, then the frame data selection circuitry 330 can select the one-pass technique to reduce latency. In some such examples, the frame data selection circuitry 330 can select pixel data associated with a previous frame to reduce latency.

If, the frame data selection circuitry 330 determines that the latency is less than the threshold, then the threshold is not satisfied, which is representative of the ALF circuitry 300 meeting encoding requirements. If the frame data selection circuitry 330 determines that the encoding requirements are met, then the frame data selection circuitry 330 can select the multi-pass technique to improve video quality. In some such examples, the frame data selection circuitry 330 can select pixel data associated with the current frame to improve video quality.

The ALF circuitry 300 of the illustrated example includes the filter selection circuitry 340 to select a filter to filter a reconstructed block, such as the reconstructed block 252 of FIG. 2. In some examples, the filter selection circuitry 340 can select one or more filters, which may include a luma ALF filter, a chroma ALF filter, and/or a CC-ALF filter. For example, the filter selection circuitry 340 can determine to turn on (e.g., enable) or turn off (e.g., disable) a luma ALF filter, a chroma ALF filter, and/or a CC-ALF filter.

In some examples, the filter selection circuitry 340 can execute pre-filter selection. For example, in response to a determination that a current frame to be encoded is not a critical frame, the filter selection circuitry 340 can select filter coefficients to utilize for encoding in an adaptation parameter set. For example, in VVC, an encoder, such as the encoder 108 of FIGS. 1 and/or 2, can use an adaptation parameter set (APS) data structure that signals various parameters, such as ALF coefficients (e.g., ALF filter coefficients), for one or more slices of video data. For example, an APS data structure may apply to a single slice or a plurality of slices. A slice may use multiple APSs, and an APS may apply to more than one slice. In some examples, an APS can include an identifier value, and a slice may indicate that an APS applies to the slice by signaling the identifier for the APS. In some examples, the identifier value for an APS may uniquely identify the APS for the corresponding bitstream.

In some examples, the filter selection circuitry 340 can determine whether filter coefficients associated with a critical frame have been encoded in an APS data structure. For example, to improve efficiency when encoding non-critical frames, the filter selection circuitry 340 can select filter coefficients that correspond to a critical frame already processed. In some such examples, the filter selection circuitry 340 select the filter coefficients of the critical frame to be encoded in the non-critical frame. In some examples, if the filter coefficients that correspond to the critical frame are not encoded in an APS data structure, then the filter selection circuitry 340 can select filter coefficients stored in a frame buffer to be encoded in the non-critical frame.

The ALF circuitry 300 of the illustrated example includes the filter generation circuitry 350 to generate filter coefficients of a video filter based on pixel data of a video frame. For example, the filter generation circuitry 350 can generate a luma ALF filter, a chroma ALF filter, and/or a CC-ALF filter having coefficients based on pixel data associated with a critical frame or a different frame. In some examples, the filter generation circuitry 350 can generate one or more video filters, such as a luma ALF filter, a chroma ALF filter, a CC-ALF filter, etc., and store the one or more video filters as the filters 372 in the datastore 370.

In some examples, the filter generation circuitry 350 can generate coefficients for a video filter based on prior pixel data, such as pixel data corresponding to a previously encoded frame. In some examples, the filter generation circuitry 350 can generate coefficients for a video filter based on pixel data of a current frame to be encoded. In some examples, the filter generation circuitry 350 can generate the coefficients as the coefficients 374 in the datastore 370.

The ALF circuitry 300 of the illustrated example includes the encoder data identification circuitry 360 to identify data to be encoded in a bitstream, such as the bitstream 228 of FIG. 2. For example, the encoder data identification circuitry 360 can identify a first filter index corresponding to a luma ALF filter, a second filter index corresponding to a chroma ALF filter, a third filter index corresponding to a CC-ALF filter, etc., to be encoded in the bitstream 228. In some examples, the encoder data identification circuitry 360 can identify first filter coefficients corresponding to the luma ALF filter, second filter coefficients corresponding to the chroma ALF filter, third filter coefficients corresponding to the CC-ALF filter, etc., to be encoded in the bitstream 228. In some examples, the encoder data identification circuitry 360 can output the one or more indices, the one or more sets of filter coefficients, etc., and/or any combination(s) thereof to the entropy coding block 208 of FIG. 2.

The ALF circuitry 300 of the illustrated example includes the datastore 370 to record data, such as the filters 372, the coefficients 374, and the critical frames 376. In some examples, the datastore 370 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 370 may additionally or alternatively be implemented by one or more double data rate (DDR) memories, such as DDR, DDR2, DDR3, DDR4, DDR5, mobile DDR (mDDR), DDR SDRAM, etc. The datastore 370 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 370 is illustrated as a single database, the datastore 370 may be implemented by any number and/or type(s) of databases. Furthermore, the data stored in the datastore 370 may be in any data format such as, for example, binary data, comma delimited data, tab delimited data, structured query language (SQL) structures, etc. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

In some examples, the apparatus includes means for receiving video data (e.g., an input image, a video frame, pixel data, etc.) to be encoded. In some examples, the means for receiving is to determine whether additional video data is received to be encoded. For example, the means for receiving may be implemented by the interface circuitry 310. In some examples, the interface circuitry 310 may be instantiated by processor circuitry such as the example processor circuitry 1212 of FIG. 12. For instance, the interface circuitry 310 may be instantiated by the example general purpose processor circuitry 1300 of FIG. 13 executing machine executable instructions such as that implemented by at least blocks 902, 926 of FIG. 9 and blocks 1102, 1118 of FIG. 11. In some examples, the interface circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the interface circuitry 310 may be instantiated by any other combination of hardware, software, and/or firmware. For example, the interface circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a first video frame as a critical image. For example, the means for identifying may be implemented by the critical frame identification circuitry 320. In some examples, the critical frame identification circuitry 320 may be instantiated by processor circuitry such as the example processor circuitry 1212 of FIG. 12. For instance, the critical frame identification circuitry 320 may be instantiated by the example general purpose processor circuitry 1300 of FIG. 13 executing machine executable instructions such as that implemented by at least block 802 of FIG. 8, blocks 904 of FIG. 9, and blocks 1104, 1106, 1108, 1110, 1112, 1114, 1116 of FIG. 11. In some examples, the critical frame identification circuitry 320 may be instantiated by hardware logic circuitry, which may be implemented by an ASIC or the FPGA circuitry 1400 of FIG. 14 structured to perform operations corresponding to the machine readable instructions. Additionally or alternatively, the critical frame identification circuitry 320 may be instantiated by any other combination of hardware, software, and/or firmware. For example, the critical frame identification circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for identifying is to measure a temporal correlation difference between the first video frame and the previous video frame, and in, response to determining that the temporal correlation difference satisfies a threshold, identify the first video frame as the critical video frame, the critical video frame representative of a difference from the previous video frame.

In some examples in which the threshold is a first threshold, and, in response to determining that the temporal correlation difference does not satisfy the threshold, the means for identifying is to determine a distance of the first video frame with respect to the prior video frame. In some such examples, the means for identifying is to, in response to determining that the distance does not satisfy a second threshold, identify the first video frame as a predicted video frame, the predicted video frame to be encoded with the second pixel data. In some such examples, the means for identifying is to, in response to determining that the distance satisfies the second threshold, identify the first video frame as the critical video frame.

In some examples, the apparatus includes means for selecting frame data (e.g., video frame data) for use in generating a filter. In some examples, the apparatus includes means for determining whether a latency associated with generating first filter coefficients satisfies a threshold. For example, the means for selecting frame data and/or the means for determining may be implemented by the frame data selection circuitry 330. In some examples, the frame data selection circuitry 330 may be instantiated by processor circuitry such as the example processor circuitry 1212 of FIG. 12. For instance, the frame data selection circuitry 330 may be instantiated by the example general purpose processor circuitry 1300 of FIG. 13 executing machine executable instructions such as that implemented by at least block 906 of FIG. 9. In some examples, the frame data selection circuitry 330 may be instantiated by hardware logic circuitry, which may be implemented by an ASIC or the FPGA circuitry 1400 of FIG. 14 structured to perform operations corresponding to the machine readable instructions. Additionally or alternatively, the frame data selection circuitry 330 may be instantiated by any other combination of hardware, software, and/or firmware. For example, the frame data selection circuitry 330 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for selecting one or more types of a video filter to be applied to a first video frame. For example, the means for selecting may be implemented by the filter selection circuitry 340. In some examples, the filter selection circuitry 340 may be instantiated by processor circuitry such as the example processor circuitry 1212 of FIG. 12. For instance, the filter selection circuitry 340 may be instantiated by the example general purpose processor circuitry 1300 of FIG. 13 executing machine executable instructions such as that implemented by at least blocks 914, 916 of FIG. 9 and blocks 1002, 1004, 1006 of FIG. 10. In some examples, the filter selection circuitry 340 may be instantiated by hardware logic circuitry, which may be implemented by an ASIC or the FPGA circuitry 1400 of FIG. 14 structured to perform operations corresponding to the machine readable instructions. Additionally or alternatively, the filter selection circuitry 340 may be instantiated by any other combination of hardware, software, and/or firmware. For example, the filter selection circuitry 340 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples in which filter coefficients are first filter coefficients, the means for selecting is to, in response to a determination that the first video frame is not a critical video frame with respect to the previous video frame, determine whether second filter coefficients associated with the critical video frame have been encoded in an adaptation parameter set data structure, and, in response to determining that the second filter coefficients have been encoded in the adaptation parameter set data structure, select the second filter coefficients to be encoded in the first video frame.

In some examples, the apparatus includes means for generating filter coefficients of a video filter based on first pixel data of a first video frame or second pixel data of a previous critical video frame. For example, the means for generating may be implemented by the filter generation circuitry 350. In some examples, the filter generation circuitry 350 may be instantiated by processor circuitry such as the example processor circuitry 1212 of FIG. 12. For instance, the filter generation circuitry 350 may be instantiated by the example general purpose processor circuitry 1300 of FIG. 13 executing machine executable instructions such as that implemented by at least block 804 of FIG. 8 and blocks 908, 910, 912, 918, 920 of FIG. 9. In some examples, the filter generation circuitry 350 may be instantiated by hardware logic circuitry, which may be implemented by an ASIC or the FPGA circuitry 1400 of FIG. 14 structured to perform operations corresponding to the machine readable instructions. Additionally or alternatively, the filter generation circuitry 350 may be instantiated by any other combination of hardware, software, and/or firmware. For example, the filter generation circuitry 350 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for generating is to generate the video filter only on the critical video frame. In some examples in which filter coefficients are first filter coefficients, the means for generating is to, in response to determining that the latency does not satisfy the threshold, generate the first filter coefficients based on the first pixel data, and, in response to determining that the latency satisfies the threshold, generate second filter coefficients of the video filter based on the second pixel data.

In some examples in which a video filter is a luminance adaptive loop filter and, in response to a first determination that the first video frame is not a critical video frame with respect to the previous video frame and a second determination to turn off a chrominance adaptive loop filter, the means for generating is to generate the luminance adaptive loop filter.

In some examples in which a video filter is a luminance adaptive loop filter and, in response to a first determination that the first video frame is not a critical video frame with respect to the previous video frame and a second determination to turn on a chrominance adaptive loop filter, the means for generating is to generate the chrominance adaptive loop filter, the luminance adaptive loop filter, and a cross-component adaptive loop filter.

In some examples, the apparatus includes means for encoding a first video frame with filter coefficients. For example, the means for encoding may be implemented by the encoder data identification circuitry 360. In some examples, the encoder data identification circuitry 360 may be instantiated by processor circuitry such as the example processor circuitry 1212 of FIG. 12. For instance, the encoder data identification circuitry 360 may be instantiated by the example general purpose processor circuitry 1300 of FIG. 13 executing machine executable instructions such as that implemented by at least block 806 of FIG. 8 and block 922 of FIG. 9. In some examples, the encoder data identification circuitry 360 may be instantiated by hardware logic circuitry, which may be implemented by an ASIC or the FPGA circuitry 1400 of FIG. 14 structured to perform operations corresponding to the machine readable instructions. Additionally or alternatively, the encoder data identification circuitry 360 may be instantiated by any other combination of hardware, software, and/or firmware. For example, the encoder data identification circuitry 360 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for encoding is to identify a filter index corresponding to respective ones of the one or more types of the video filter, encode the first video frame with the filter index, and output the encoded first video frame. In some examples in which filter coefficients are first filter coefficients, the means for encoding is to, in response to determining that the second filter coefficients have not been encoded in the adaptation parameter set data structure, encode the first video frame with third filter coefficients stored in a decoded video frame buffer.

In some examples in which a video filter is a luminance adaptive loop filter, and, in response to a first determination that the first video frame is not a critical video frame with respect to the previous video frame and a second determination to turn off a chrominance adaptive loop filter, the means for encoding is to identify a filter index corresponding to the luminance adaptive loop filter, and encode the first video frame with the filter index.

In some examples in which a video filter is a luminance adaptive loop filter, and, in response to a first determination that the first video frame is not a critical video frame with respect to the previous video frame and a second determination to turn on a chrominance adaptive loop filter, the means for encoding is to, identify a first filter index corresponding to the luminance adaptive loop filter, a second filter index corresponding to the chrominance adaptive loop filter, and a third filter index corresponding to the cross-component adaptive loop filter. In some such examples, the means for encoding is to encode the first video frame with the first filter index, the second filter index, and the third filter index.

In some examples, the apparatus includes means for encoding video data and/or means for outputting encoded video data. In some examples, the means for encoding and/or the means for outputting may be implemented by the encoder 108 of FIGS. 1 and/or 2. In some examples, the encoder 108 may be instantiated by processor circuitry such as the example processor circuitry 1212 of FIG. 12. For instance, the encoder 108 may be instantiated by the example general purpose processor circuitry 1300 of FIG. 13 executing machine executable instructions such as that implemented by at least block 924 of FIG. 9. In some examples, the encoder 108 may be instantiated by hardware logic circuitry, which may be implemented by an ASIC or the FPGA circuitry 1400 of FIG. 14 structured to perform operations corresponding to the machine readable instructions. Additionally or alternatively, the encoder 108 may be instantiated by any other combination of hardware, software, and/or firmware. For example, the encoder 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the ALF filter 238 of FIG. 2 is illustrated in FIG. 3, one or more of the elements, processes, and/or devices illustrated in FIG. 2 may be combined, divided, re-arranged, omitted, eliminated, and/or implemented in any other way. Further, the interface circuitry 310, the critical frame identification circuitry 320, the frame data selection circuitry 330, the filter selection circuitry 340, the filter generation circuitry 350, the encoder data identification circuitry 360, the datastore 370, the filters 372, the coefficients 374, the critical frames 376, the bus 380, and/or, more generally, the example ALF filter 238 of FIG. 2, may be implemented by hardware alone or by hardware in combination with software and/or firmware. Thus, for example, any of the interface circuitry 310, the critical frame identification circuitry 320, the frame data selection circuitry 330, the filter selection circuitry 340, the filter generation circuitry 350, the encoder data identification circuitry 360, the datastore 370, the filters 372, the coefficients 374, the critical frames 376, the bus 380, and/or, more generally, the example ALF filter 238, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s). Further still, the example ALF filter 238 of FIG. 2 may include one or more elements, processes, and/or devices in addition to, or instead of, those illustrated in FIG. 3, and/or may include more than one of any or all of the illustrated elements, processes and devices.

Figure 4:
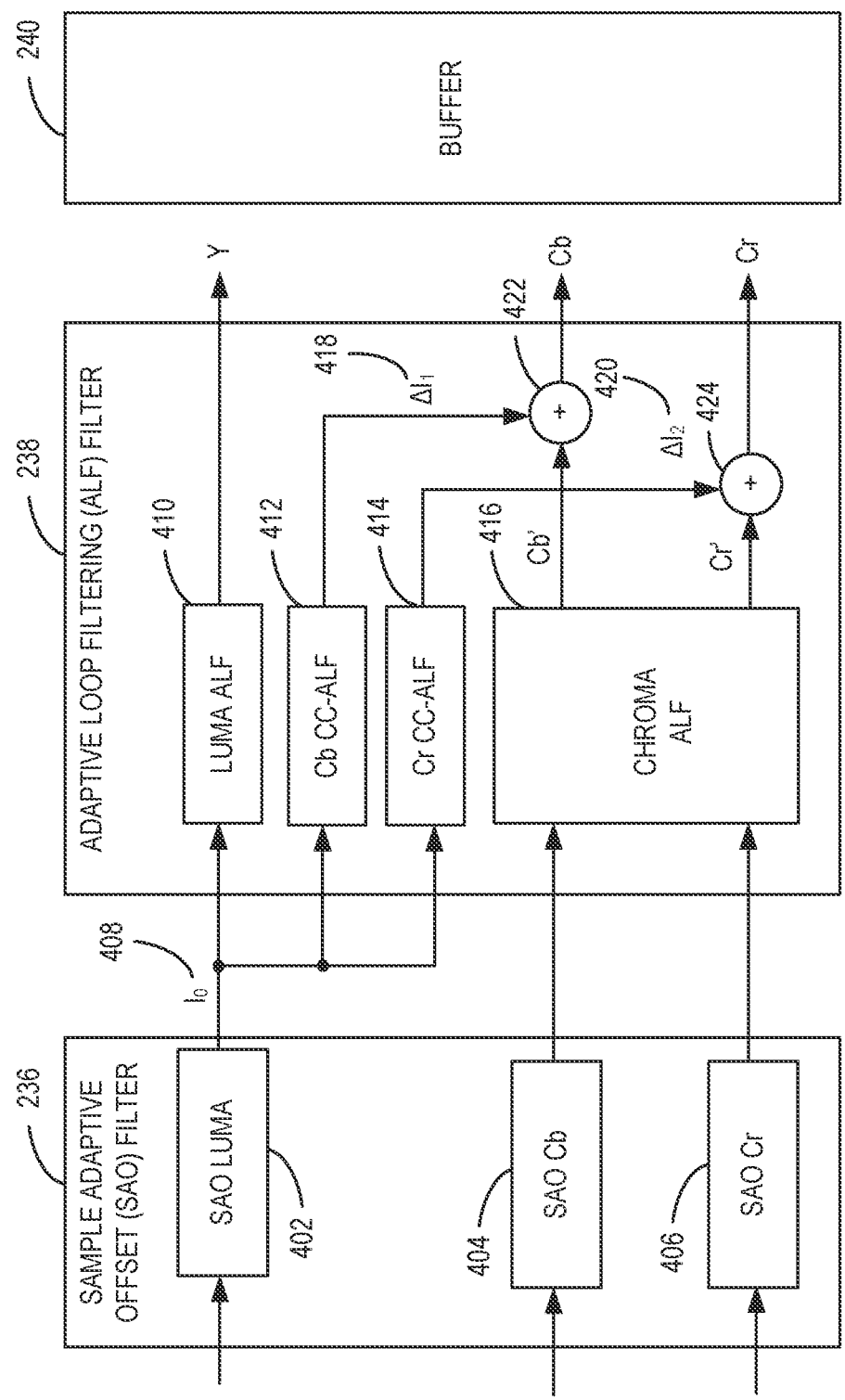
FIG. 4 is a block diagram of another example implementation of the adaptive loop filter of FIGS. 2 and/or 3, which includes an example chrominance adaptive loop filter and an example luminance adaptive loop filter.

FIG. 4 is a block diagram of an example implementation of the SAO filter 236, the ALF filter 238, and the buffer 240 of FIG. 2. The SAO filter 236 of the illustrated example includes an example SAO luma filter 402, an example SAO Cb filter 404, and an example SAO Cr filter 406. In this example, the SAO filter 236 can reduce sample distortion by first classifying reconstructed samples into different categories, obtaining an offset for each category, and then adding the offset to each sample of the category. For example, the offset can be included in a look-up table generated and/or maintained by the encoder 108 of FIGS. 1 and/or 2. In some examples, the SAO filter 236 can apply edge offsets and/or border offsets. For edge offsets, the SAO filter 236 can determine the classification of the reconstructed samples based on comparisons between current samples and neighboring samples. For border offsets, the SAO filter 236 can determine the classification of the reconstructed samples based on sample values.

In the illustrated example, the SAO luma filter 402 can process reconstructed luma samples to output example processed luma samples 408 (identified by $I_0$). In the illustrated example, the SAO Cb filter 404 can process reconstructed Cb samples (e.g., a blue minus luma (B-Y) sample in a YCbCr color space or format). In the illustrated example, the SAO Cr filter 406 can process reconstructed Cr samples (e.g., a red minus luma (R-Y) sample in a YCbCr color space or format).

In the illustrated example, the ALF filter 238 operates to reduce and/or otherwise minimize a difference between an original input (e.g., the coding block 218 or portion(s) of the input image 216) and the outputs from the SAO filter 236 through Wiener filtering.

The ALF filter 238 of the illustrated example includes a first example ALF filter 410 (identified by LUMA ALF), a first example CC-ALF filter 412 (identified by Cb CC-ALF), a second example CC-ALF filter 414 (identified by Cr CC-ALF), and a second example ALF filter 416 (identified by CHROMA ALF). The first ALF filter 410 is an ALF filter that processes luma samples, such as the processed luma samples 408 from the SAO luma filter 402. The first CC-ALF filter 412 is a CC-ALF filter that cross-correlates luma samples (e.g., the processed luma samples 408 from the SAO luma filter 402) and Cb samples. The second CC-ALF filter 414 is a CC-ALF filter that cross-correlates luma samples (e.g., the processed luma samples 408 from the SAO luma filter 402) and Cr samples. The second ALF filter 416 is an ALF filter that processes Cb samples from the SAO Cb filter 404 and Cr samples from the SAO Cr filter 406.

During the encoder process, an encoder (e.g., the encoder 108) can generate filter coefficients and provide the filter coefficients to a decoder (e.g., the decoder 114). In some examples, the first ALF filter 410 and the second ALF filter 416 can be implemented using symmetric diamond filter shapes for luma and chroma filtering. Example implementations of the first ALF filter 410 and the second ALF filter 416 are depicted in the illustrated example of FIG. 7.

Figure 6:
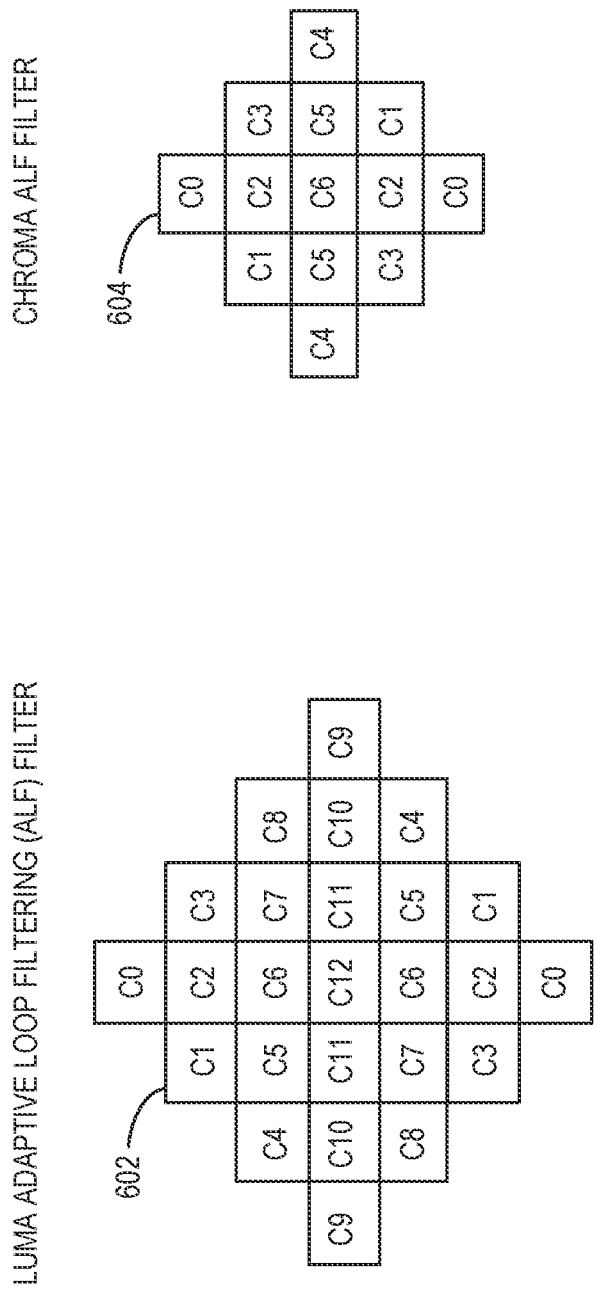
FIG. 6 is an illustration of an example implementation of the chrominance adaptive loop filter and the luminance adaptive loop filter of FIGS. 4 and/or 5.

Turning to the illustrated example of FIG. 6, a first example ALF filter 602 and a second example ALF filter 604 are depicted. In some examples, the first ALF filter 602 can implement the first ALF filter 410 of FIG. 4. In some examples, the second ALF filter 604 can implement the second ALF filter 416. In some examples, the first ALF filter 602 and/or the second ALF filter 604 can implement one(s) of the filters 372 of FIG. 3.

The first ALF filter 602 has a 7×7 diamond shape supported for luma components. For example, each square of the first ALF filter 602 corresponds to a luma sample and the center square corresponds to a current-to-be-filtered sample. The second ALF filter 604 has a 5×5 diamond shape supported for chroma components. For example, each square of the second ALF filter 604 corresponds to a chroma sample and the center square corresponds to a current-to-be-filtered sample.

In some examples, to reduce the signaling overhead and the number of multiplications, the filter coefficients of the first ALF filter 602 and the second ALF filter 604 use point symmetry. In some examples, the filter coefficients of the first ALF filter 602 and/or the second ALF filter 604 can implement one(s) of the coefficients 374 of FIG. 3. For example, each integer filter coefficient $c_i$ can be represented with 7-bit fractional precision (or a different fractional precision). In some such examples, the sum of coefficients of one filter can be equal to 128, which is the fixed-point representation of 1.0 with 7-bit fractional precision, to preserve DC neutrality. The sum of coefficients is represented by the example of Equation (1) below. In Equation (1), the number of coefficients N is equal to 13 for the 7×7 filter shape (e.g., $c_0$-$c_{12}$) of the first ALF filter 602 and 7 for the 5×5 filter shape (e.g., $c_0$-$c_6$) of the second ALF filter 604.

$$2\sum_{i=0}^{N-2} c_i + c_{N-1} = 128, \qquad \text{Equation (1)}$$

In some examples, the filtering for one pixel can be described with the example of Equation (2) below:

$$O'(x,y) = I(x,y) + \sum_{(i,j) \ne (0,0)} w_{(i,j)} \cdot (I(x+i, y+j) - I(x,y)), \qquad \text{Equation (2)}$$

In the illustrated example of Equation (2) above, I(x, y) is the pixel value (e.g., a luma value, a chroma value, etc.) to be filtered and w(i, j) are the filter coefficients (e.g., $c_i$). A value based on the summation over the filter shape can be a compensation value to be added to I(x, y) to yield the original pixel value (e.g., a pixel value in the coding block 218, portion(s) of the input image 216, etc.).

To reduce the filtering impact of neighboring pixels, clipping is applied to the differences between a current pixel and neighboring pixels based on the example of Equation (3) below:

$$O'(x,y)=I(x,y)+\Sigma_{(i,j)\neq(0,0)}w(i,j)K(I(x+i,y+j)-I(x,y),k(i,j)), \quad \text{Equation (3)}$$

In the illustrated example of Equation (3) above, $K(d, b)=\min(b, \max(-b, d))$ and $k(i, j)$ are the clipping parameters signaled in a bitstream, such as the bitstream 228. In some examples, for each signaled luma filter and chroma filter, one set of $k(i, j)$ is signaled. In some examples, the encoder 108 derives a clipping value index for the filter coefficients. For example, for each luma filter, 13 clipping value indices can be signaled (e.g., one index for one filter coefficient position). In some examples, for each chroma filter, 7 clipping value indices can be signaled (e.g., one index for one filter coefficient position).

Turning back to the illustrated example of FIG. 4, the first CC-ALF filter 412 and the second CC-ALF filter 414 use the processed luma samples 408 to refine the chroma sample values within the ALF filter 238. In the illustrated example, the first CC-ALF filter 412 and the second CC-ALF filter 414 implement linear filtering operation(s) to take the processed luma samples 408 as inputs and generates example correction values 418, 420 for the chroma sample values as outputs. For example, the first CC-ALF filter 412 can generate a first example correction value 418 (identified by $\Delta I_1$) and the second CC-ALF filter 414 can generate a second example correction value 420 (identified by $\Delta I_2$).

In some examples, the first CC-ALF filter 412 and the second CC-ALF filter 414 have 3×4 diamond filter shapes with 7 filter coefficients to be signaled in the bitstream 228. In some examples, the first CC-ALF filter 412 and the second CC-ALF filter 414 can each be implemented by the example of Equation (4) below:

$$\Delta I_i(x,y)=\Sigma_{(x_n,y_n)\in S_i}I_0(x_Y+x_0,y_Y+y_0)c_i(x_0,y_0), \quad \text{Equation (4)}$$

In the illustrated example of Equation (4) above, (x, y) is the sample location of the chroma component i, $(x_Y, y_Y)$ is the luma sample location derived from (x, y), $(x_0, y_0)$ are the filter support offset around $(x_Y, y_Y)$, $S_i$ is the filter support region in luma for the chroma component i, and $c_i(x_0, y_0)$ represents the filter coefficients of the component i. The luma location $(x_Y, y_Y)$ is determined based on the spatial scaling factor between the chroma and luma planes. The sample values in the luma support region are also inputs to the luma ALF stage and correspond to the output of the SAO stage. In some examples, the first correction value 418 and the second correction value 420 can be determined using Equation (4) above.

In some examples, up to 4 alternative CC-ALF filters are signaled for Cb and Cr, respectively, in one APS data structure. In some examples, separate CC-ALF control flags and APS IDs are signaled in a picture header or sequence header for Cb and Cr. For example, a first CC-ALF control flag and a first APS ID corresponding to the first CC-ALF filter 412 can be signaled. In some examples, a second CC-ALF control flag and a second APS ID corresponding to the second CC-ALF filter 414 can be signaled. In some examples, separate CTB level filter control flags and filter indices are signaled for Cb and Cr. For example, a first CTB level filter control flag and a first filter index corresponding to the first CC-ALF filter 412 can be signaled. In some examples, a second CTB level filter control flag and a second filter index corresponding to the second CC-ALF filter 414 can be signaled.

In example operation, the first ALF filter 410 outputs a corrected luma value Y based on the processed luma samples 408. The second ALF filter 416 outputs a first interim corrected chroma sample Cb' to a first adder 422 and a second interim corrected chroma sample Cr' to a second adder 424. The first adder 422 outputs a first corrected chroma sample Cb to the buffer 240 based on Cb' and the first correction value 418. The second adder 424 outputs a second corrected chroma sample Cr to the buffer 240 based on Cr' and the second correction value 420. In example operation, the buffer 240 can provide Y, Cr, and Cb to the motion estimation block 210 and the inter prediction mode block 242 of FIG. 2.

In some examples, when generating a filter set (e.g., a luma set for the first ALF filter 410, a chroma set for the second ALF filter 416), the ALF filter 238 first calculates a filter for each of the classes (e.g., the 25 luma classes for the first ALF filter 410). For example, the first ALF filter 410 can apply a merging algorithm to these 25 filters. In each iteration, by merging two filters, the first ALF filter 410 can execute the merging algorithm to reduce the number of filters by 1. In some examples, to determine which two filters should be merged, for every pair of the remaining filters, the first ALF filter 410 can redesign a filter by merging two filters and the corresponding pixel data, respectively. Using the redesigned filter, the first ALF filter 410 can estimate the distortion. The first ALF filter 410 can merge the pair with the smallest distortion. In some examples, 25 filter sets are obtained, the first set having 25 filters, the second one 24 filters, and so on until the 25th one contains a single filter. The first ALF filter 410 can select the set that minimizes rate-distortion cost, including bits required to code filter coefficients. The second ALF filter 416 can similarly select a set of filters that minimizes rate-distortion cost by calculating a filter for each class and applying a merging algorithm to the classes.

When generating a filter (e.g., the first ALF filter 410, the second ALF filter 416, etc.), the clipping indices and the N−1 filter coefficients are calculated iteratively by the ALF filter 238 until there is no decrease of the square error. In each iteration, the values of the clipping indices are updated one by one, starting with index d0 and continuing until index dN−2 is reached. In some examples, when updating the index, up to 3 options are tested: keeping its value unchanged, increasing by 1 or decreasing by 1. For example, the first ALF filter 410 can calculate the filter coefficients and the approximate distortion for these 3 values and the value that minimizes square error is selected. At the start of the first iteration the values of clipping indices are initialized to 2, or when merging two filters, the value of di is set to the average of the corresponding clipping indices for these filters.

Figure 5:
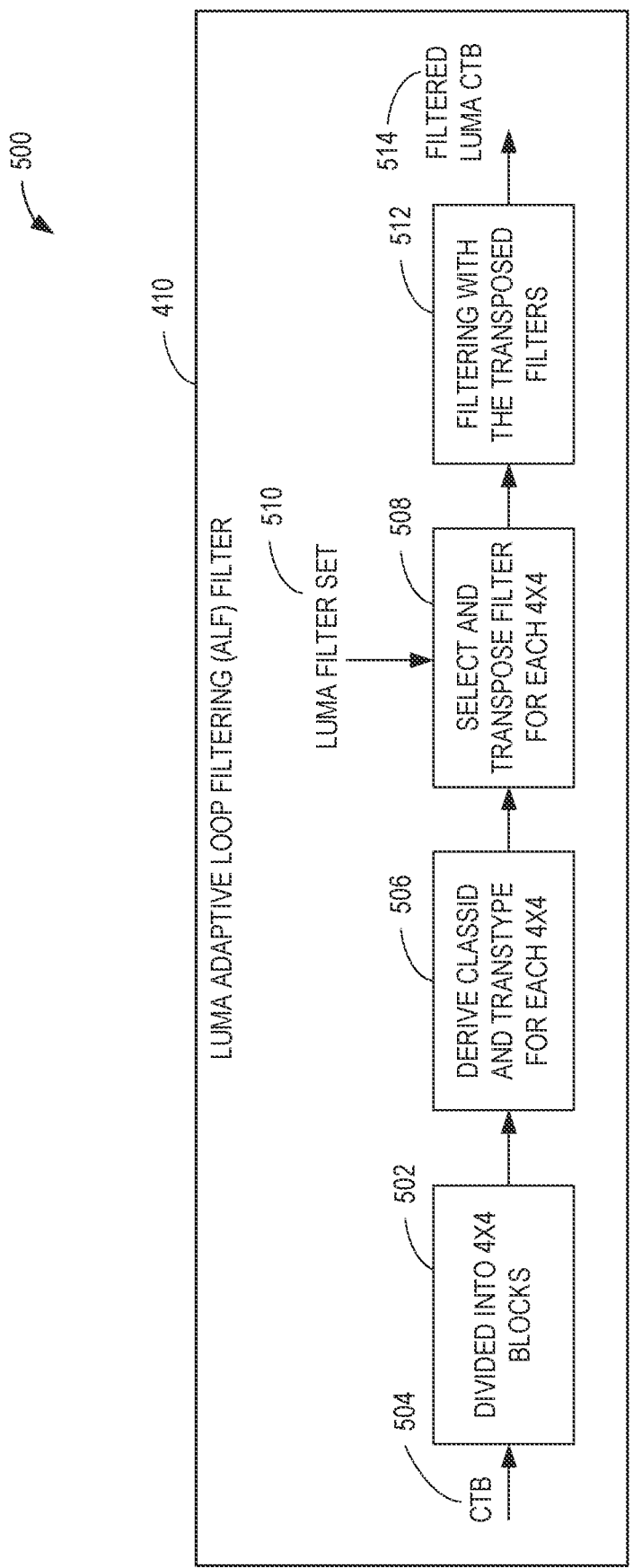
FIG. 5 is a block diagram of an example workflow to implement the luminance adaptive loop filter of FIG. 4.

FIG. 5 is a block diagram of an example workflow 500 to implement the luma ALF filter 410 of FIG. 4. During a first operation 502, the luma ALF filter 410 receives an example CTB 504. For example, the CTB 504 can be a luma sample of a CTU. During the first operation 502, the luma ALF filter 410 divides the CTB 504 into sub blocks, such as 4×4 blocks. During a second operation 506, the luma ALF filter 410 derives a class identification (identified by CLASSID) and a transform type (identified by TRANSTYPE) for each of the 4×4 blocks. For example, 25 classes (or a different number of classes) can be defined based on the local sample gradients of the 4×4 blocks. In some examples, 4 transpose types can be defined to transpose the filter coefficients before they are applied to filter the corresponding 4×4 blocks. For example, the transpose types can include geometric transformations such as 90-degree rotation, diagonal, or vertical flip within the filter shape.

During a third operation 508, the luma ALF filter 410 receives a luma filter set 510, such as a set of 25 filters. For example, there can be one filter for each of the classes defined in the second operation 506. During the third operation 508, the luma ALF filter 410 selects and transposes one(s) of the luma filter set 510 for each of the 4×4 blocks. During a fourth operation 512, the luma ALF filter 410 filters the 4×4 blocks of the CTB 504 with the transposed filters to output a filtered luma CTB 514. In some examples, the luma ALF filter 410 can output the filtered luma CTB 514 to the buffer 240.

In some examples, to reduce the APS syntax overhead of signaling all 25 luma filters, the encoder 108 can adaptively merge block classes to use the same filter to minimize rate distortion cost, and then signal one(s) of the following parameters in APS: the number of different filters used for the new filter set, the coefficients of the finally used filters, which signaled filter should be used for a particular class, etc.

Figure 7:
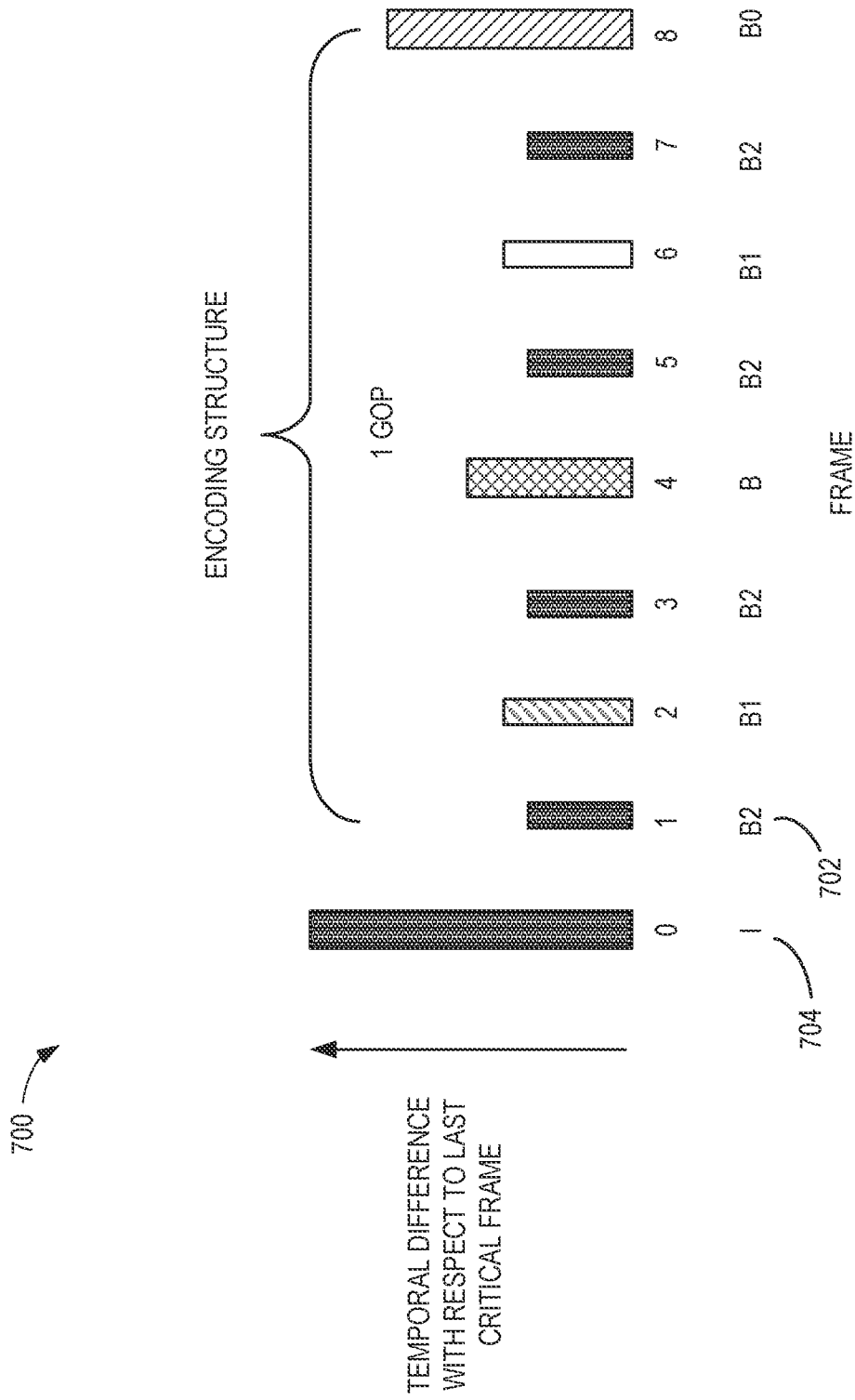
FIG. 7 is an illustration of an example group of pictures.

FIG. 7 is an illustration of an example group of pictures (GOP) 700. The GOP 700 is a GOP8 because the GOP 700 includes 8 frames. For example, the GOP 700 can have an encoding structure of 8 frames per GOP, or a GOP8 encoding structure. The GOP 700 includes example bidirectional frames 702 (e.g., B-frames identified by B, B0, B1, or B2) depicted as having a temporal difference with respect to the last critical frame. For example, the bidirectional frames 702 can have respective a temporal difference with respect to an example intra-coded frame 704 (e.g., an I-frame, an intra-coded video frame, etc.), which precedes the GOP 700.

In some examples, the critical frame identification circuitry 320, and/or, more generally, the ALF circuitry 300 of FIG. 3, can determine a recommended distance between critical frames. For example, the critical frame identification circuitry 320 can identify the intra-coded frame 704 as a critical frame. In some examples, the critical frame identification circuitry 320 can determine a recommended distance between the intra-coded frame 704 and a subsequent critical frame, which may be one of the bidirectional frames 702. For example, the critical frame identification circuitry 320 can determine a recommended distance in a range of 7 to 9 positions (e.g., 7 to 9 positions, inclusive) based on temporal correlation differences between a current frame, which may be B2 at position 1, and the prior critical frame such as the intra-coded frame 704 at position 0.

In the illustrated example, the bidirectional frames 702 having the greatest temporal difference are B at position 4 and B0 at position 8. In some such examples, the critical frame identification circuitry 320 can identify B0 at position 8 to be the next critical frame because B0 is 8 positions away from the intra-coded frame 704, and 8 positions is included in the range of 7 to 9 positions. In some examples, the critical frame identification circuitry 320 can identify the remaining frames in the GOP 700 as non-critical frames. For example, the critical frame identification circuitry 320 can identify the bidirectional frames 702 at positions 1-7 as non-critical frames. In some examples, the intra-coded frame 704 and/or the B0 frame can implement one(s) of the critical frames 376 of FIG. 3.

Flowcharts representative of example hardware logic circuitry, machine readable instructions, hardware implemented state machines, and/or any combination thereof for implementing the ALF circuitry 300 of FIG. 3 are shown in FIGS. 8-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 8-11, many other methods of implementing the example ALF circuitry 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 8-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
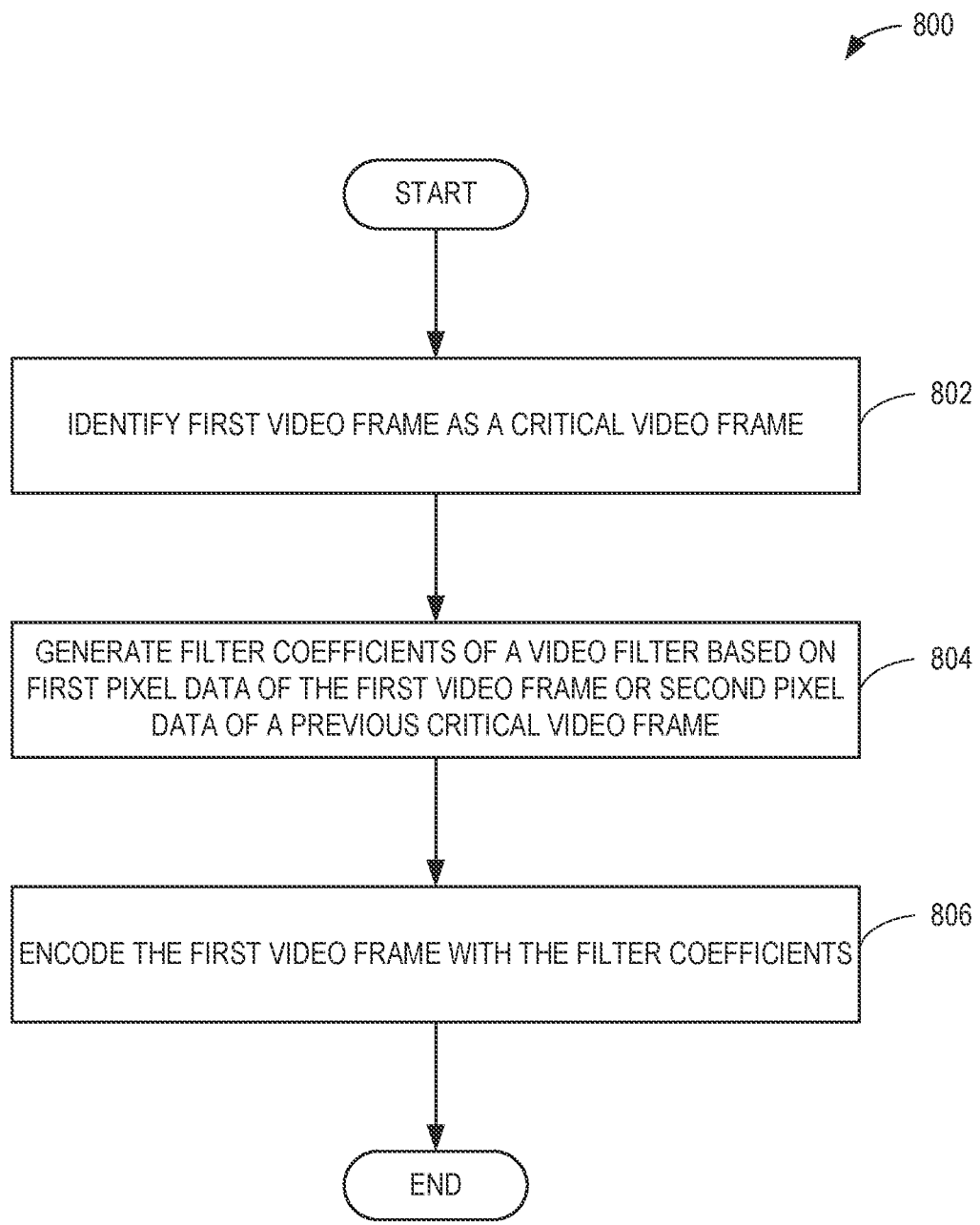
FIG. 8 is a flowchart representative of example machine readable instructions and/or example operations that may be executed and/or instantiated by example processor circuitry to implement the adaptive loop filter circuitry of FIGS. 2 and/or 3 to encode a video frame with filter coefficients.

FIG. 8 is a flowchart representative of example machine readable instructions and/or example operations 800 that may be executed and/or instantiated by processor circuitry to encode a video frame with filter coefficients. The machine readable instructions and/or the operations 800 of FIG. 8 begin at block 802, at which the ALF circuitry 300 identifies a first video frame as a critical frame. For example, the critical frame identification circuitry 320 (FIG. 3) can identify B0 at position 8 of the GOP 700 of FIG. 7 as a critical frame, which may be a scene change from a previous frame, such as B2 at position 7 of the GOP 700, or representative of a different (e.g., a temporal and/or spatial difference) with respect to a previous or prior video frame.

At block 804, the ALF circuitry 300 generates filter coefficients of a video filter based on first pixel data of the first video frame or second pixel data of a previous video frame. For example, the filter generation circuitry 350 (FIG. 3) can generate first filter coefficients of the first ALF filter 602 of FIG. 6 based on luma values of pixels of B0. In some examples, the filter generation circuitry 350 can generate second filter coefficients of the second ALF filter 604 of FIG. 6 based on chroma values of the pixels of B0. In some examples, in response to a determination that B0 is not a critical video frame, the filter generation circuitry 350 can generate first filter coefficients of the first ALF filter 602 based on luma values of a previous critical video frame, such as the intra-coded frame 704 of FIG. 7 to improve efficiency of the first ALF filter 602. In some such examples, in response to the determination that B0 is not a critical video frame, the filter generation circuitry 350 can generate second filter coefficients of the second ALF filter 604 based on chroma values of a previous critical video frame, such as the intra-coded frame 704 of FIG. 7, to improve efficiency of the second ALF filter 604. Alternatively, the filter generation circuitry 350 may disable the second ALF filter 604 to improve efficiency in response to determining that B0 is not a critical frame.

At block 806, the ALF circuitry 300 encodes the first video frame with the filter coefficients. For example, the encoder data identification circuitry 360 (FIG. 3) can identify the first filter coefficients and/or the second filter coefficients to be signaled and/or otherwise included in the bitstream 228 of FIG. 2. In some such examples, the encoder data identification circuitry 360 can instruct the entropy coding block 208 of FIG. 2 to signal the first filter coefficients and/or the second filter coefficients with B0. In some such examples, the entropy coding block 208 can output the bitstream 228 representative of B0, the first filter coefficients, and/or the second filter coefficients to the decoding system 104 of FIG. 1. In response to encoding the first video frame with the filter coefficients at block 806, the example machine readable instructions and/or the operations 800 of FIG. 8 conclude.

Figure 9:
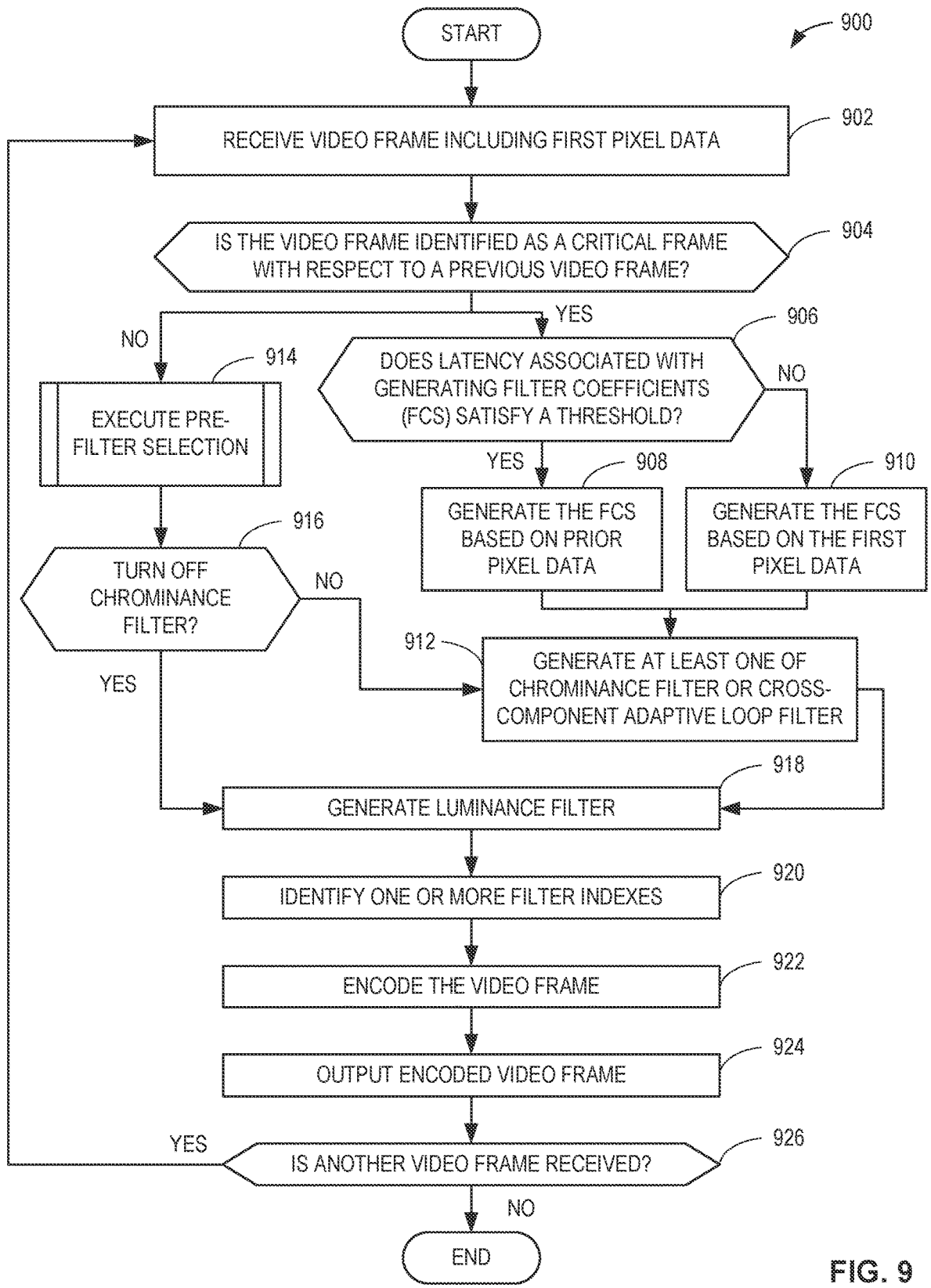
FIG. 9 is another flowchart representative of example machine readable instructions and/or example operations that may be executed and/or instantiated by example processor circuitry to implement the adaptive loop filter circuitry of FIGS. 2 and/or 3 to encode a video frame with filter coefficients.

FIG. 9 is another flowchart representative of example machine readable instructions and/or example operations 900 that may be executed and/or instantiated by processor circuitry to encode a video frame with filter coefficients. The machine readable instructions and/or the operations 900 of FIG. 9 begin at block 902, at which the ALF circuitry 300 receives a video frame including first pixel data. For example, the interface circuitry 310 (FIG. 3) can receive frame B2 of the bidirectional frames 702 of FIG. 7. In some such examples, the interface circuitry 310 can receive pixel data, such as the luma samples 408, from the SAO filter 236.

At block 904, the ALF circuitry 300 determines whether the video frame is identified as a critical frame with respect to a previous video frame. For example, the critical frame identification circuitry 320 (FIG. 3) can determine whether B2 is a critical frame with respect to the intra-coded frame 704 of FIG. 7 based on temporal correlation analysis.

If, at block 904, the ALF circuitry 300 determines that the video frame is identified as a critical frame with respect to a previous video frame, control proceeds to block 906. At block 906, the ALF circuitry 300 determines whether a latency associated with generating filter coefficients (FCS) satisfy a threshold. For example, the frame data selection circuitry 330 (FIG. 3) can determine that a latency associated with waiting for the complete processing of pixel data of B2 prior to generating the filter coefficients does not meet encoding requirements, which may include a latency threshold.

If, at block 906, the ALF circuitry 300 determines that the latency associated with generating filter coefficients satisfies a threshold, control proceeds to block 908. At block 908, the ALF circuitry 300 generates the filter coefficients based on prior pixel data. For example, the filter generation circuitry 350 (FIG. 3) can generate the filter coefficients of the first ALF filter 602 of FIG. 6 based on luma values associate with the intra-coded frame 704 rather than luma values included in B2. Advantageously, generating the filter coefficients based on pixel values of the intra-coded frame 704 can be more efficient (e.g., reduced latency, reduced runtime, etc.) than waiting for the pixel values of B2 to be completely processed.

If, at block 906, the ALF circuitry 300 determines that the latency associated with generating filter coefficients does not satisfy a threshold, control proceeds to block 910. At block 910, the ALF circuitry 300 generates the filter coefficients based on the first pixel data. For example, the filter generation circuitry 350 can generate the filter coefficients of the first ALF filter 602 of FIG. 6 based on luma values included in B2. Advantageously, generating the filter coefficients based on pixel values of a frame to be encoded can produce higher video quality than video quality associated with generating the filter coefficients based on pixel values of a previously encoded frame.

In response to generating the filter coefficients at either block 908 or block 910, control proceeds to block 912. At block 912, the ALF circuitry 300 generates at least one of a chrominance filter or a cross-component adaptive loop filter. For example, the filter generation circuitry 350 can generate at least one of the first CC-ALF filter 412, the second CC-ALF filter 414, or the second ALF filter 416 of FIG. 4 based on the filter coefficients.

If, at block 904, the ALF circuitry 300 determines that the video frame is not identified as a critical frame with respect to a previous video frame, control proceeds to block 914. At block 914, the ALF circuitry 300 executes pre-filter selection. An example process that may be performed to implement block 914 is described below in connection with FIG. 10.

At block 916, the ALF circuitry 300 determines whether to turn off a chrominance filter. For example, the filter selection circuitry 340 (FIG. 3) can determine to turn off the second ALF filter 416 of FIG. 4 in response to a determination that there are no significant chroma variations between the intra-coded frame 704 and B2.

If, at block 916, the ALF circuitry 300 determines not to turn off the chrominance filter (i.e., turn on the chrominance filter), control proceeds to block 912. If, at block 916, the ALF circuitry 300 determines to turn off the chrominance filter, control proceeds to block 918 to generate a luminance filter. For example, the filter generation circuitry 350 can generate the first ALF filter 410 of FIG. 4.

In response to generating the luminance filter at block 918, the ALF circuitry 300 identifies one or more filter indices at block 920. For example, the encoder data identification circuitry 360 (FIG. 3) can identify a first filter index that corresponds to the first ALF filter 410, a second filter index that corresponds to the first CC-ALF filter 412, a third filter index that corresponds to the second CC-ALF filter 414, and/or a fourth filter index that corresponds to the second ALF filter 416.

At block 922, the ALF circuitry 300 encodes the video frame. For example, the encoder data identification circuitry 360 encodes and/or otherwise causes B2 to be encoded in the bitstream 228 of FIG. 2.

At block 924, the ALF circuitry 300 outputs the encoded video frame. For example, the encoder data identification circuitry 360 outputs and/or otherwise causes B2 to be output from the entropy coding block 208, and/or, more generally, from the encoder 108, to the decoder system 104 of FIG. 1.

At block 926, the ALF circuitry 300 determines whether another video frame is received. For example, the interface circuitry 310 can determine that frame B1 at position 1 of the GOP 700 is received to be encoded in the bitstream 228. If, at block 926, the ALF circuitry 300 determines that another video frame is received, control returns to block 902, otherwise the example machine readable instructions and/or the operations 900 conclude.

Figure 10:
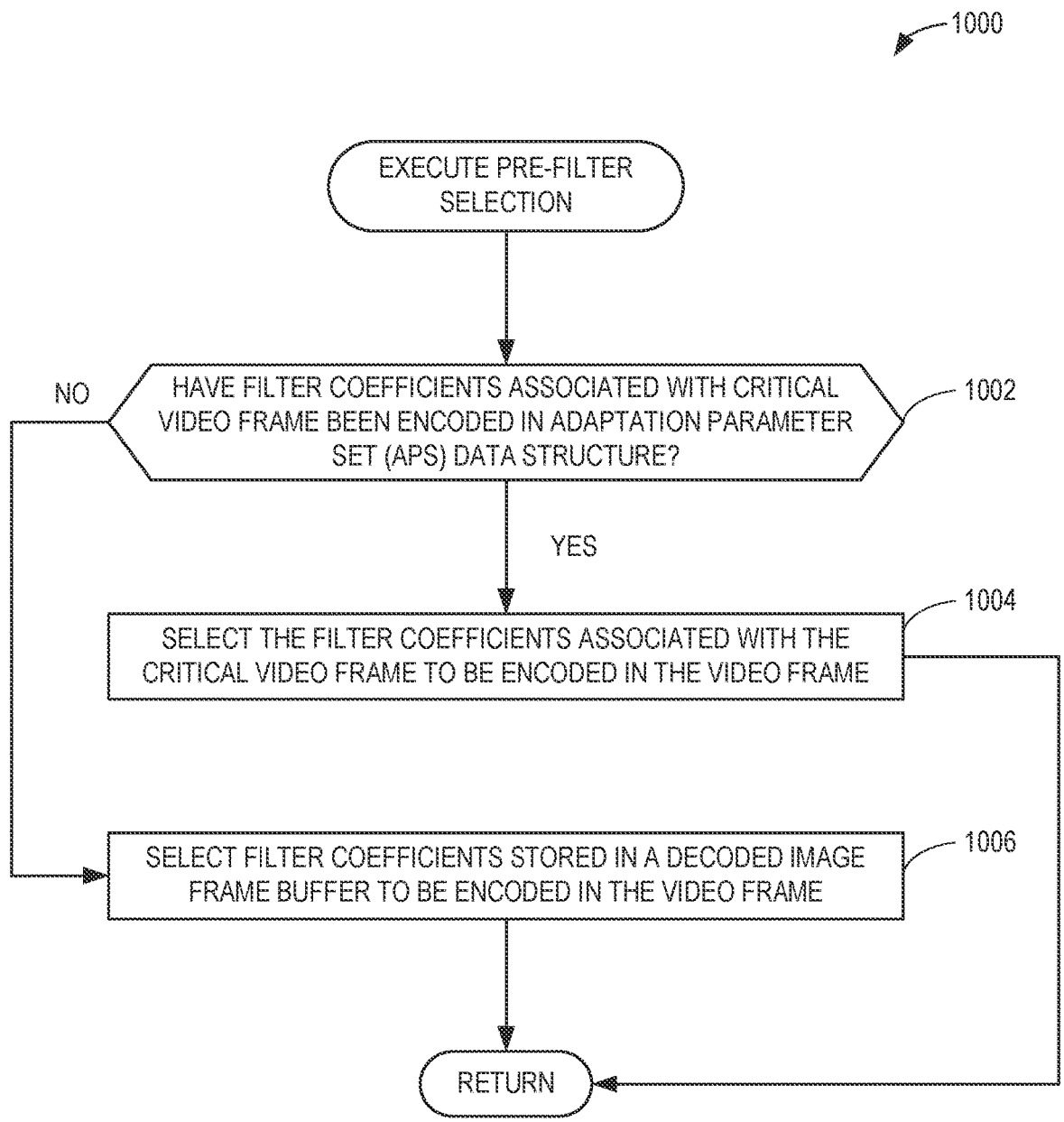
FIG. 10 is a flowchart representative of example machine readable instructions and/or example operations that may be executed and/or instantiated by example processor circuitry to implement the adaptive loop filter circuitry of FIGS. 2 and/or 3 to execute pre-filter selection.

FIG. 10 is a flowchart representative of example machine readable instructions and/or example operations 1000 that may be executed and/or instantiated by processor circuitry to execute pre-filter selection. In some examples, the example machine readable instructions and/or example operations 1000 may be executed and/or instantiated by processor circuitry to implement block 914 of FIG. 9. The machine readable instructions and/or the operations 1000 of FIG. 10 begin at block 1002, at which the ALF circuitry 300 determines whether filter coefficients associated with a critical video frame have been encoded in an adaptation parameter set (APS) data structure. For example, the filter selection circuitry 340 (FIG. 3) can determine whether filter coefficients associated with the intra-coded frame 704 of FIG. 7 have been encoded in an APS data structure, such as an APS data structure stored in the buffer 240 or previously encoded by the entropy coding block 208 of FIG. 2.

If, at block 1002, the ALF circuitry 300 determines that the filter coefficients associated with the critical video frame have been encoded in the APS data structure, control proceeds to block 1004. At block 1004, the ALF circuitry 300 selects the filter coefficients associated with the critical video frame to be encoded in the video frame. For example, the filter selection circuitry 340 can select the filter coefficients associated with the intra-coded frame 704 to be encoded with a frame to be encoded, such as B2 at position 1 of the GOP 700, to reduce latency and improve efficiency of the encoder 108 when encoding the frame to be encoded. In response to selecting the filter coefficients associated with the critical video frame to be encoded in the video frame at block 1004, the example machine readable instructions and/or the operations 1000 of FIG. 10 conclude. For example, the machine readable instructions and/or the operations 1000 of FIG. 10 can return to block 916 of FIG. 9 to determine whether to turn off a chrominance filter.

If, at block 1002, the ALF circuitry 300 determines that the filter coefficients associated with the critical video frame have not been encoded in the APS data structure, control proceeds to block 1006. At block 1006, the ALF circuitry 300 selects filter coefficients stored in a decoded image frame buffer to be encoded in the video frame. For example, the filter selection circuitry 340 can select filter coefficients associated with the frame to be encoded, such as B2 to be encoded with the frame to be encoded. In some examples, the filter coefficients associated with the frame to be encoded can be stored in the buffer 240. In response to selecting the filter coefficients stored in a decoded image frame buffer to be encoded in the video frame at block 1006, the example machine readable instructions and/or the operations 1000 of FIG. 10 conclude. For example, the machine readable instructions and/or the operations 1000 of FIG. 10 can return to block 916 of FIG. 9 to determine whether to turn off a chrominance filter.

Figure 11:
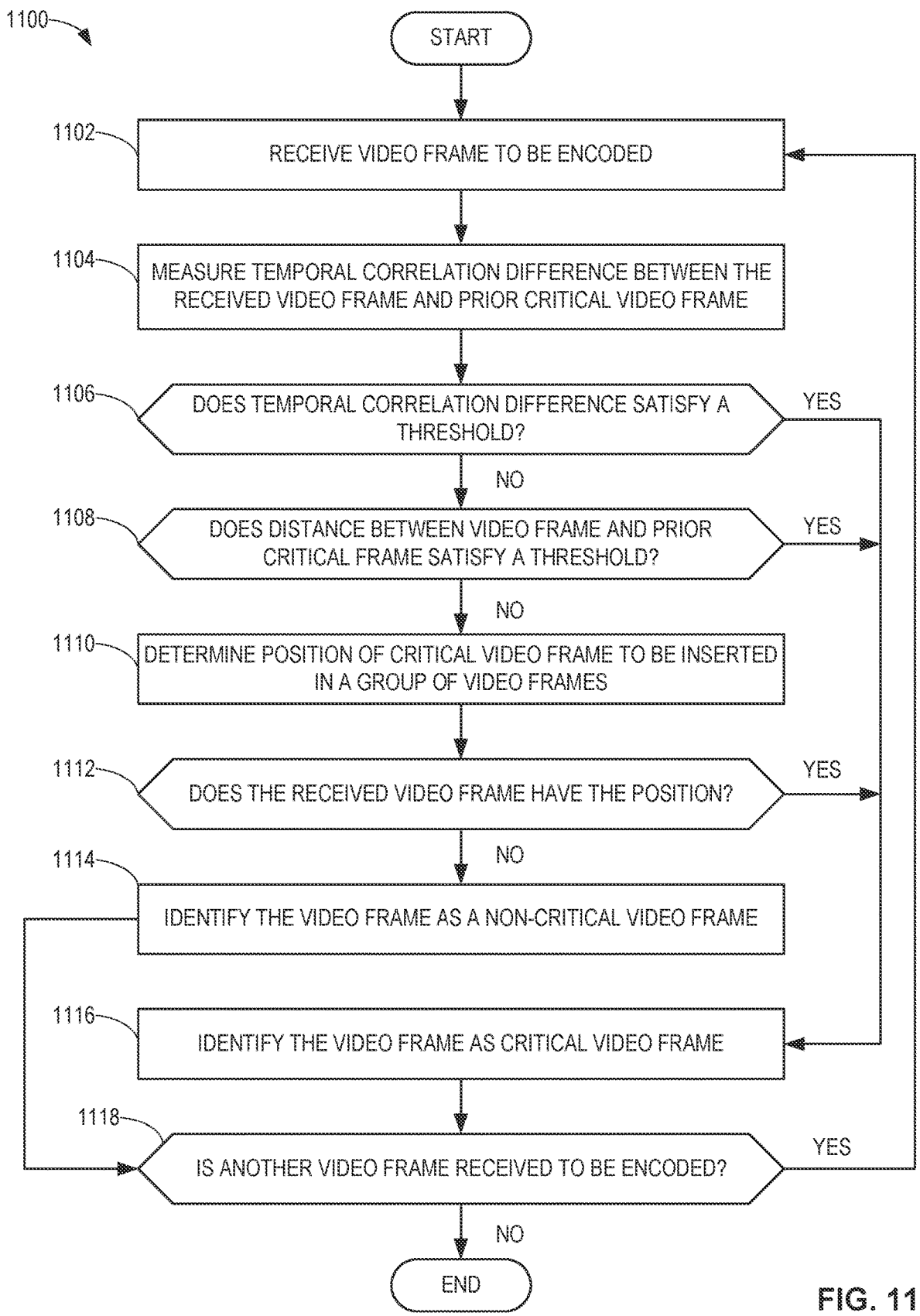
FIG. 11 is a flowchart representative of example machine readable instructions and/or example operations that may be executed and/or instantiated by example processor circuitry to implement the adaptive loop filter circuitry of FIGS. 2 and/or 3 to determine whether to identify a video frame as a critical video frame.

FIG. 11 is a flowchart representative of example machine readable instructions and/or example operations 1100 that may be executed and/or instantiated by processor circuitry to determine whether to identify a video frame as a critical video frame. The machine readable instructions and/or the operations 1100 of FIG. 11 begin at block 1102, at which the ALF circuitry 300 receives a video frame to be encoded. For example, the interface circuitry 310 (FIG. 3) can receive a video frame to be encoded, such as B at position 4 of the GOP 700 of FIG. 7.

At block 1104, the ALF circuitry 300 measures a temporal correlation difference between the received video frame and a prior critical video frame. For example, the critical frame identification circuitry 320 (FIG. 3) can determine a temporal correlation difference between the intra-coded frame 704 and frame B.

At block 1106, the ALF circuitry 300 determines whether a temporal correlation difference satisfies a threshold. For example, the critical frame identification circuitry 320 can determine that the temporal correlation difference between B2 and the intra-coded frame 704 is greater than a threshold, such as a temporal correlation difference threshold.

If, at block 1106, the ALF circuitry 300 determines that the temporal correlation difference satisfies a threshold, control proceeds to block 1116. At block 1116, the ALF circuitry 300 identifies the video frame as a critical video frame. For example, the critical frame identification circuitry 320 can identify frame B as a critical frame with respect to the intra-coded frame 704. In response to identifying the video frame as a critical video frame at block 1116, control proceeds to block 1118.

If, at block 1106, the ALF circuitry 300 determines that the temporal correlation difference does not satisfy a threshold, control proceeds to block 1108. At block 1108, the critical frame identification circuitry 320 determines whether a distance between the video frame and a prior critical frame satisfies a threshold. For example, the critical frame identification circuitry 320 can determine whether frame B is a critical frame based on whether a distance of frame B from the intra-coded frame 704 satisfies a threshold (e.g., a distance threshold). For example, the critical frame identification circuitry 320 can determine that frame B is not a critical frame because the distance between frame B and the intra-coded frame 704 is 4 and the distance of 4 does not satisfy a threshold of 7-9 because 4 is less than 7-9 (or a distance of 7, 8, or 9).

If, at block 1108, the ALF circuitry 300 determines that a distance between a video frame and a prior critical frame satisfies a threshold, control proceeds to block 1116, otherwise control proceeds to block 1110. At block 1110, the ALF circuitry 300 determines a position of a critical video frame to be inserted in a group of video frames. For example, the critical frame identification circuitry 320 can calculate a recommended distance of 7-9 from the intra-coded frame 704 at which another critical frame is to be inserted for encoding. In some such examples, the critical frame identification circuitry 320 can calculate the recommended distance based on the temporal correlation difference of B with respect to the intra-coded frame 704.

At block 1112, the ALF circuitry 300 determines whether the received video frame has the position. For example, the critical frame identification circuitry 320 can determine that frame B has the position 4 in the GOP 700, which is different from the recommended distance of 7-9 from the intra-coded frame 704 (e.g., a recommended position of 7 or 8 in the GOP 700, or a 0 in a subsequent GOP).

If, at block 1112, the ALF circuitry 300 determines that the received video frame has the position, control proceeds to block 1116. If, at block 1112, the ALF circuitry 300 determines that the received video frame does not have the position, then, at block 1114, the ALF circuitry 300 identifies the video frame as a non-critical video frame. For example, the critical frame identification circuitry 320 can determine that frame B is not a critical video frame.

In response to identifying the video frame as a non-critical frame at block 1114, control proceeds to block 1118. At block 1118, the ALF circuitry 300 determines whether another video frame is received to be encoded. For example, the interface circuitry 310 can determine that frame B2 at position 5 is received for encoding in the bitstream 228. If, at block 1118, the ALF circuitry 300 determines that another video frame is received to be encoded, control returns to block 1102, otherwise the example machine readable instructions and/or the operations 1100 of FIG. 11 conclude.

Figure 12:
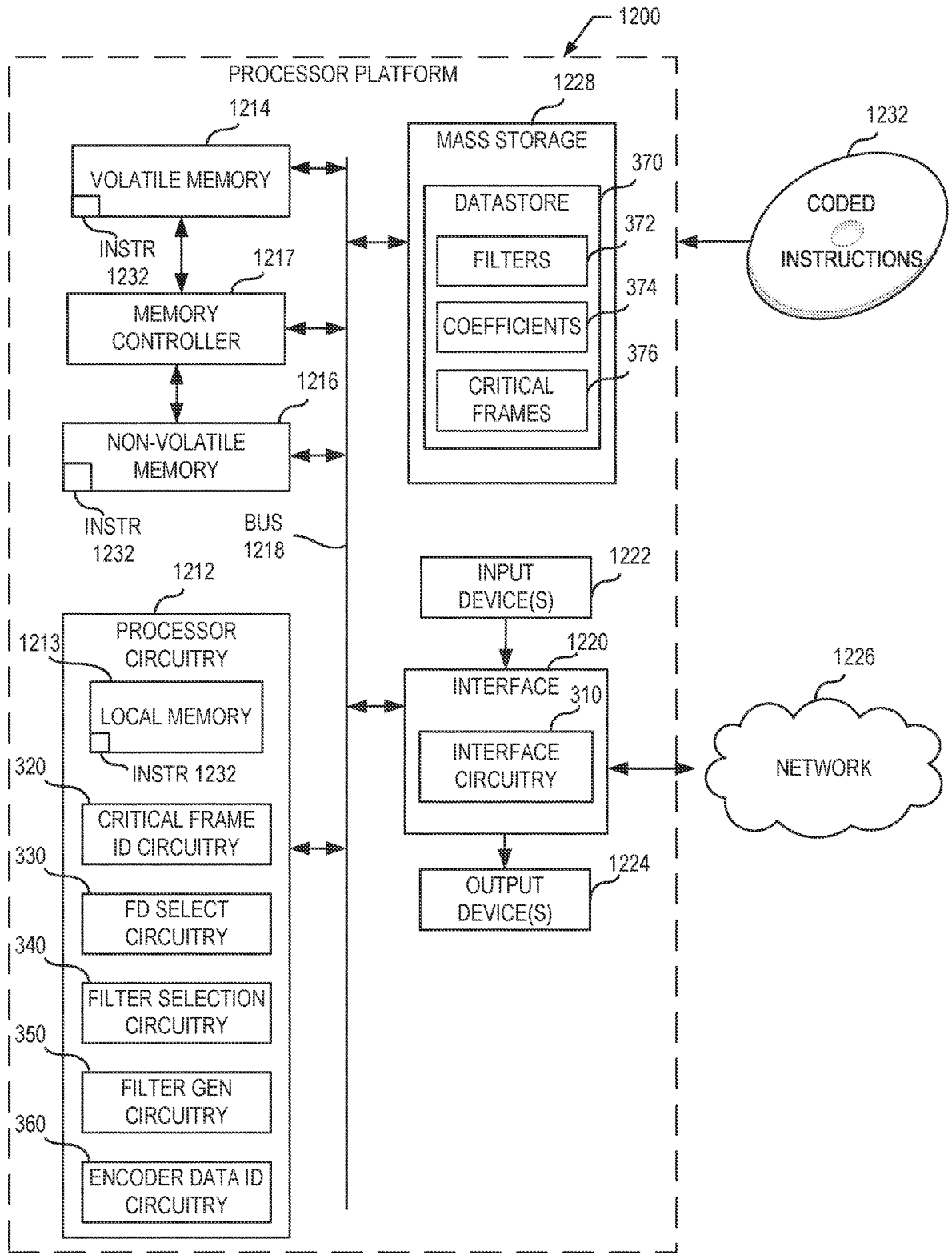
FIG. 12 is a block diagram of an example processing platform including processor circuitry structured to execute the example machine readable instructions and/or the example operations of FIGS. 8-11 to implement the adaptive loop filter circuitry of FIG. 3.

FIG. 12 is a block diagram of an example processor platform 1200 structured to execute and/or instantiate the machine readable instructions and/or the operations of FIGS. 8-11 to implement the ALF circuitry 300 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the critical frame identification circuitry 320 (identified by CRITICAL FRAME ID CIRCUITRY), the frame data selection circuitry 330 (identified by FD SELECT CIRCUITRY), the filter selection circuitry 340, the filter generation circuitry 350 (identified by FILTER GEN CIRCUITRY), and the encoder data identification circuitry 360 (identified by ENCODER DATA ID CIRCUITRY) of FIG. 3.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. In some examples, the bus 1218 implements the bus 380 of FIG. 3. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. In this example, the interface circuitry 1220 implements the interface circuitry 310 of FIG. 3. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage device 1228 implements the datastore 370, the filters 372, the coefficients 374, and the critical frames 376 of FIG. 3.

The machine executable instructions 1232, which may be implemented by the machine readable instructions of FIGS. 8-11, may be stored in the mass storage device 1228, in the volatile memory 1214, in the non-volatile memory 1216, and/or on a removable non-transitory computer readable storage medium such as a CD or DVD.

Figure 13:
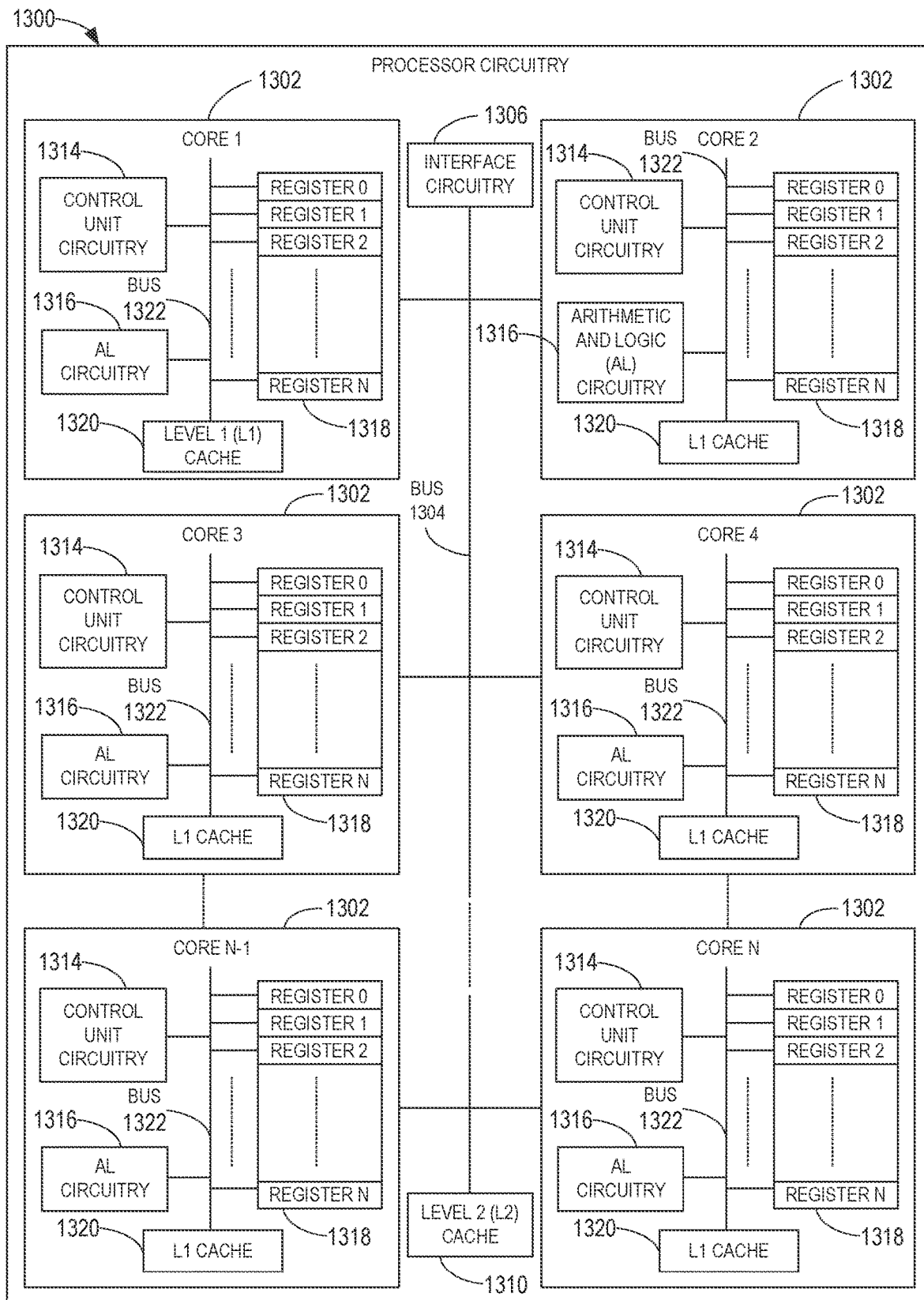
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 8-11 to effectively instantiate the ALF circuitry 300 of FIG. 3 as logic circuits to perform the operations corresponding to those machine readable instructions. In some such examples, the ALF circuitry 300 of FIG. 3 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 8-11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
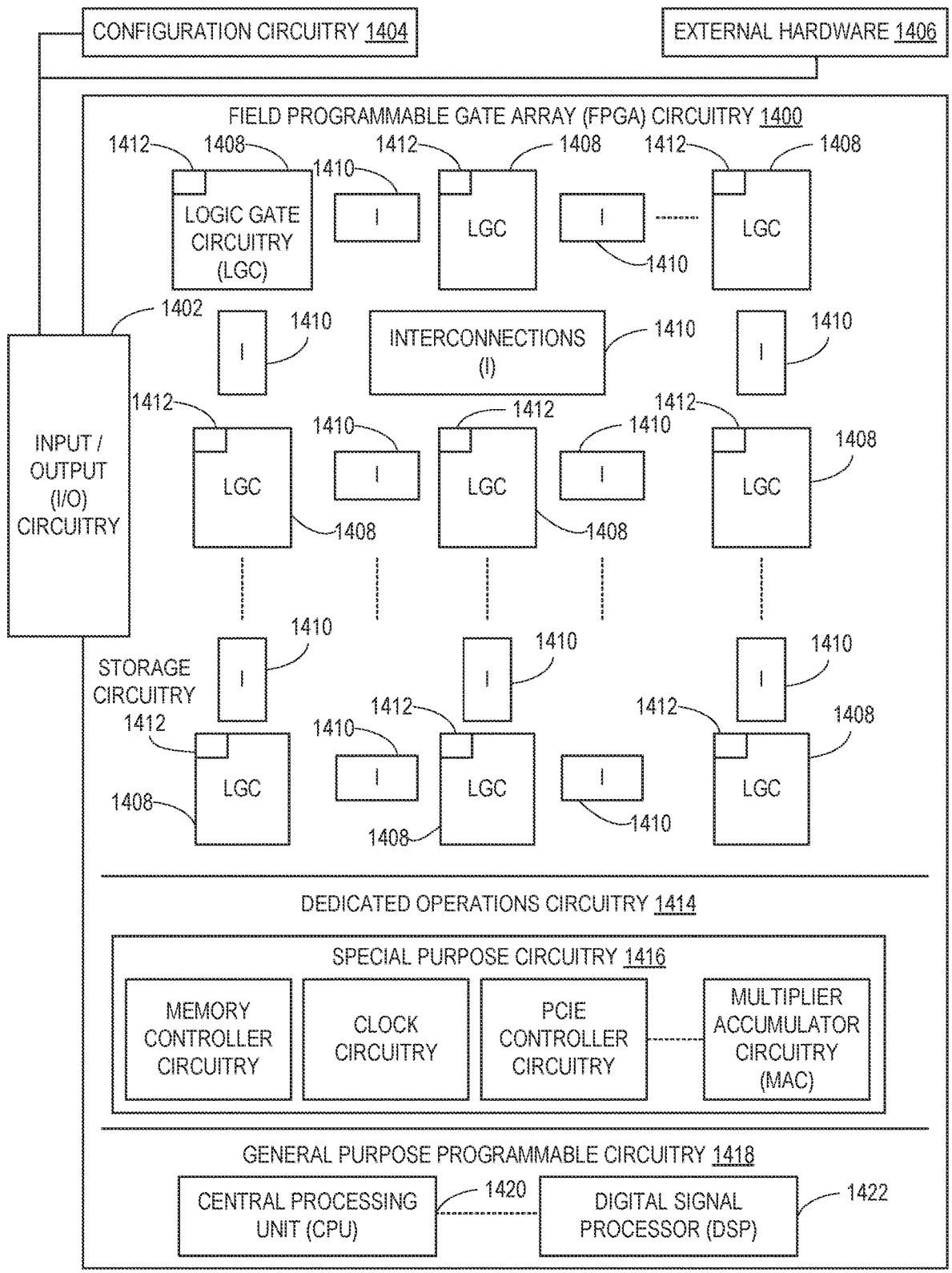
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 8-11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIG. 8-11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 8-11. As such, the FPGA circuitry 1400 may be structured to effectively instantiate some or all of the machine readable instructions of the flowcharts of FIGS. 8-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 8-11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 8-11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 8-11 may be executed by one or more of the cores 1302 of FIG. 13, a second portion of the machine readable instructions represented by the flowcharts of FIGS. 8-11 may be executed by the FPGA circuitry 1400 of FIG. 14, and/or a third portion of the machine readable instructions represented by the flowcharts of FIGS. 8-11 may be executed by an ASIC. It should be understood that some or all of the ALF circuitry 300 of FIG. 3 may, thus, be instantiated at the same or different times. Some or all of the circuitry may be instantiated, for example, in one or more threads executing concurrently and/or in series. Moreover, in some examples, some or all of the ALF circuitry 300 of FIG. 3 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
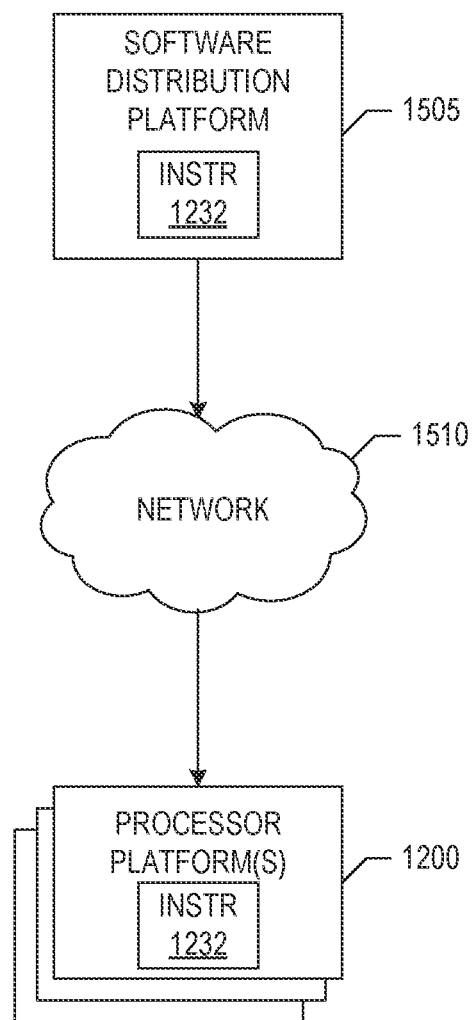
FIG. 15 is a block diagram of an example software distribution platform (e.g., one or more servers) to distribute software (e.g., software corresponding to the example machine readable instructions of FIGS. 8-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 800, 900, 1000, 1100 of FIGS. 8-11, as described above. The one or more servers of the example software distribution platform 1505 are in communication with a network 1510, which may correspond to any one or more of the Internet and/or any of the example networks 118, 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1232 of FIG. 12, may be downloaded to the example processor platform 1200, which is to execute the machine readable instructions 1232 to implement the ALF circuitry 300 of FIG. 3. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed for improved adaptive loop filtering. Disclosed systems, methods, apparatus, and articles of manufacture improve the efficiency of using a computing device by applying the image level filtering derivation process only to the critical frame (e.g., the critical video frame). For the non-critical frames, the luma ALF can simply reuse the filters of its prior critical frame as the new filter candidate. For the non-critical frames, the chroma ALF and/or the CC-ALF can either simply reuse the filters of its prior critical frame as the new filter candidate or adaptively turn off in the image level. A one-pass solution is disclosed to utilize prior pixel data for current filter derivation for reduced latency and improved hardware, software, and/or firmware efficiency. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for improved adaptive loop filtering are disclosed herein. Further examples and combinations thereof include the following:

Example 1 includes an apparatus to improve video encoding, the apparatus comprising at least one memory, instructions, and processor circuitry to at least one of execute or instantiate the instructions to identify a first video frame as a critical video frame with respect to a previous video frame, generate filter coefficients of a video filter based on first pixel data of the first video frame or second pixel data of a previous critical video frame, and encode the first video frame with the filter coefficients.

In Example 2, the subject matter of Example 1 can optionally include that the processor circuitry is to at least one of execute or instantiate the instructions to generate the video filter only on the critical video frame.

In Example 3, the subject matter of Examples 1-2 can optionally include that the filter coefficients are first filter coefficients, and the processor circuitry is to at least one of execute or instantiate the instructions to determine whether a latency associated with generating the first filter coefficients satisfies a threshold, in response to determining that the latency does not satisfy the threshold, generate the first filter coefficients based on the first pixel data, and in response to determining that the latency satisfies the threshold, generate second filter coefficients of the video filter based on the second pixel data.

In Example 4, the subject matter of Examples 1-3 can optionally include that the processor circuitry is to at least one of execute or instantiate the instructions to select one or more types of the video filter to be applied to the first video frame, identify a filter index corresponding to respective ones of the one or more types of the video filter, encode the first video frame with the filter index, and output the encoded first video frame.

In Example 5, the subject matter of Examples 1~4 can optionally include that the filter coefficients are first filter coefficients, and the processor circuitry is to at least one of execute or instantiate the instructions to, in response to determining that the first video frame is not a critical video frame with respect to the previous video frame determine whether second filter coefficients associated with a critical video frame have been encoded in an adaptation parameter set data structure, in response to determining that the second filter coefficients have been encoded in the adaptation parameter set data structure, select the second filter coefficients to be encoded in the first video frame, and in response to determining that the second filter coefficients have not been encoded in the adaptation parameter set data structure, encode the first video frame with third filter coefficients stored in a decoded video frame buffer.

In Example 6, the subject matter of Examples 1-5 can optionally include that the video filter is a luminance adaptive loop filter, and the processor circuitry is to at least one of execute or instantiate the instructions to, in response to determining that the first video frame is not a critical video frame with respect to the previous video frame and determining to turn off a chrominance adaptive loop filter generate the luminance adaptive loop filter, identify a filter index corresponding to the luminance adaptive loop filter, and encode the first video frame with the filter index.

In Example 7, the subject matter of Examples 1-6 can optionally include that the video filter is a luminance adaptive loop filter, and the processor circuitry is to at least one of execute or instantiate the instructions to, in response to determining that the first video frame is not a critical video frame with respect to the previous video frame and determining to turn on a chrominance adaptive loop filter generate the chrominance adaptive loop filter, the luminance adaptive loop filter, and a cross-component adaptive loop filter, identify a first filter index corresponding to the luminance adaptive loop filter, a second filter index corresponding to the chrominance adaptive loop filter, and a third filter index corresponding to the cross-component adaptive loop filter, and encode the first video frame with the first filter index, the second filter index, and the third filter index.

In Example 8, the subject matter of Examples 1-7 can optionally include that the processor circuitry is to at least one of execute or instantiate the instructions to measure a temporal correlation difference between the first video frame and the previous video frame, and in response to determining that the temporal correlation difference satisfies a threshold, identify the first video frame the critical video frame, the critical video frame representative of a difference from the previous video frame.

In Example 9, the subject matter of Examples 1-8 can optionally include that the threshold is a first threshold, and the processor circuitry is to at least one of execute or instantiate the instructions to, in response to determining that the temporal correlation difference does not satisfy the first threshold determine a distance of the first video frame with respect to the prior video frame, in response to determining that the distance does not satisfy a second threshold, identify the first video frame as a predicted video frame, the predicted video frame to be encoded with the second pixel data, and in response to determining that the distance satisfies the second threshold, identify the first video frame as the critical video frame.

Example 10 includes an apparatus to improve video encoding, the apparatus comprising means for identifying a first video frame as a critical video frame with respect to a previous video frame, means for generating filter coefficients of a video filter based on first pixel data of the first video frame or second pixel data of a previous critical video frame, and means for encoding the first video frame with the filter coefficients.

In Example 11, the subject matter of Example 10 can optionally include that the means for generating is to generate the video filter only on the critical video frame.

In Example 12, the subject matter of Examples 10-11 can optionally include that the filter coefficients are first filter coefficients, and further including means for determining whether a latency associated with generating the first filter coefficients satisfies a threshold, and the means for generating to generate, in response to determining that the latency does not satisfy the threshold, generate the first filter coefficients based on the first pixel data, and in response to determining that the latency satisfies the threshold, generate second filter coefficients of the video filter based on the second pixel data.

In Example 13, the subject matter of Examples 10-12 can optionally include means for selecting one or more types of the video filter to be applied to the first video frame, and the means for encoding to identify a filter index corresponding to respective ones of the one or more types of the video filter, encode the first video frame with the filter index, and output the encoded first video frame.

In Example 14, the subject matter of Examples 10-13 can optionally include that the filter coefficients are first filter coefficients, and further including means for selecting to, in response to a determination that the first video frame is not a critical video frame with respect to the previous video frame determine whether second filter coefficients associated with the critical video frame have been encoded in an adaptation parameter set data structure, and in response to determining that the second filter coefficients have been encoded in the adaptation parameter set data structure, select the second filter coefficients to be encoded in the first video frame, and the means for encoding to, in response to determining that the second filter coefficients have not been encoded in the adaptation parameter set data structure, encode the first video frame with third filter coefficients stored in a decoded video frame buffer.

In Example 15, the subject matter of Examples 10-14 can optionally include that the video filter is a luminance adaptive loop filter, and, in response to a first determination that the first video frame is not a critical video frame with respect to the previous video frame and a second determination to turn off a chrominance adaptive loop filter, the means for generating to generate the luminance adaptive loop filter, and the means for encoding to identify a filter index corresponding to the luminance adaptive loop filter, and encode the first video frame with the filter index.

In Example 16, the subject matter of Examples 10-15 can optionally include that the video filter is a luminance adaptive loop filter, and, in response to a first determination that the first video frame is not a critical video frame with respect to the previous video frame and a second determination to turn on a chrominance adaptive loop filter, the means for generating to generate the chrominance adaptive loop filter, the luminance adaptive loop filter, and a cross-component adaptive loop filter, and the means for encoding to identify a first filter index corresponding to the luminance adaptive loop filter, a second filter index corresponding to the chrominance adaptive loop filter, and a third filter index corresponding to the cross-component adaptive loop filter, and encode the first video frame with the first filter index, the second filter index, and the third filter index.

In Example 17, the subject matter of Examples 10-16 can optionally include that the means for identifying is to measure a temporal correlation difference between the first video frame and the previous video frame, and in response to determining that the temporal correlation difference satisfies a threshold, identify the first video frame as the critical video frame, the critical video frame representative of a difference from the previous video frame.

In Example 18, the subject matter of Examples 10-17 can optionally include that the threshold is a first threshold, and, in response to determining that the temporal correlation difference does not satisfy the threshold, the means for identifying is to determine a distance of the first video frame with respect to the prior video frame, in response to determining that the distance does not satisfy a second threshold, identify the first video frame as a predicted video frame, the predicted video frame to be encoded with the second pixel data, and in response to determining that the distance satisfies the second threshold, identify the first video frame as the critical video frame.

Example 19 includes at least one non-transitory computer readable storage medium comprising instructions that, when executed, cause processor circuitry to at least identify a first video frame as a critical video frame with respect to a previous video frame, generate filter coefficients of a video filter based on first pixel data of the first video frame or second pixel data of a previous critical video frame, and encode the first video frame with the filter coefficients.

In Example 20, the subject matter of Example 19 can optionally include that the instructions, when executed, cause the processor circuitry to generate the video filter only on the critical video frame.

In Example 21, the subject matter of Examples 19-20 can optionally include that the filter coefficients are first filter coefficients, and the instructions, when executed, cause the processor circuitry to determine whether a latency associated with generating the first filter coefficients satisfies a threshold, in response to determining that the latency does not satisfy the threshold, generate the first filter coefficients based on the first pixel data, and in response to determining that the latency satisfies the threshold, generate second filter coefficients of the video filter based on the second pixel data.

In Example 22, the subject matter of Examples 19-21 can optionally include that the instructions, when executed, cause the processor circuitry to select one or more types of the video filter to be applied to the first video frame, identify a filter index corresponding to respective ones of the one or more types of the video filter, encode the first video frame with the filter index, and output the encoded first video frame.

In Example 23, the subject matter of Examples 19-22 can optionally include that the filter coefficients are first filter coefficients, and the instructions, when executed, cause the processor circuitry to, in response to determining that the first video frame is not a critical video frame with respect to the previous video frame determine whether second filter coefficients associated with an intra-coded video frame have been encoded in an adaptation parameter set data structure, in response to determining that the second filter coefficients have been encoded in the adaptation parameter set data structure, select the second filter coefficients to be encoded in the first video frame, and in response to determining that the second filter coefficients have not been encoded in the adaptation parameter set data structure, encode the first video frame with third filter coefficients stored in a decoded video frame buffer.

In Example 24, the subject matter of Examples 19-23 can optionally include that the video filter is a luminance adaptive loop filter, and the instructions, when executed, cause the processor circuitry to, in response to determining that the first video frame is not a critical video frame with respect to the previous video frame and determining to turn off a chrominance adaptive loop filter generate the luminance adaptive loop filter, identify a filter index corresponding to the luminance adaptive loop filter, and encode the first video frame with the filter index.

In Example 25, the subject matter of Examples 19-24 can optionally include that the video filter is a luminance adaptive loop filter, and the instructions, when executed, cause the processor circuitry to, in response to determining that the first video frame is not a critical video frame with respect to the previous video frame and determining to turn on a chrominance adaptive loop filter generate the chrominance adaptive loop filter, the luminance adaptive loop filter, and a cross-component adaptive loop filter, identify a first filter index corresponding to the luminance adaptive loop filter, a second filter index corresponding to the chrominance adaptive loop filter, and a third filter index corresponding to the cross-component adaptive loop filter, and encode the first video frame with the first filter index, the second filter index, and the third filter index.

In Example 26, the subject matter of Examples 19-25 can optionally include that the instructions, when executed, cause the processor circuitry to measure a temporal correlation difference between the first video frame and the previous video frame, and in response to determining that the temporal correlation difference satisfies a threshold, identify the first video frame as the critical video frame, the critical video frame representative of a difference from the previous video frame.

In Example 27, the subject matter of Examples 19-26 can optionally include that the threshold is a first threshold, and the instructions, when executed, cause the processor circuitry to, in response to determining that the temporal correlation difference does not satisfy the threshold determine a distance of the first video frame with respect to the prior video frame, in response to determining that the distance does not satisfy a second threshold, identify the first video frame as a predicted video frame, the predicted video frame to be encoded with the second pixel data, and in response to determining that the distance satisfies the second threshold, identify the first video frame as the critical video frame.

Example 28 includes a method to improve video encoding, the method comprising identifying a first video frame as a critical video frame with respect to a previous video frame, generating filter coefficients of a video filter based on first pixel data of the first video frame or second pixel data of a previous critical video frame, and encoding the first video frame with the filter coefficients.

In Example 29, the subject matter of Example 28 can optionally include generating the video filter only on the critical video frame.

In Example 30, the subject matter of Examples 28-29 can optionally include that the filter coefficients are first filter coefficients, and further including determining whether a latency associated with generating the first filter coefficients satisfies a threshold, in response to determining that the latency does not satisfy the threshold, generating the first filter coefficients based on the first pixel data, and in response to determining that the latency satisfies the threshold, generating second filter coefficients of the video filter based on the second pixel data.

In Example 31, the subject matter of Examples 28-30 can optionally include selecting one or more types of the video filter to be applied to the first video frame, identifying a filter index corresponding to respective ones of the one or more types of the video filter, encoding the first video frame with the filter index, and outputting the encoded first video frame.

In Example 32, the subject matter of Examples 28-31 can optionally include that the filter coefficients are first filter coefficients, and further including, in response to determining that the first video frame is not a critical video frame with respect to the previous video frame determining whether second filter coefficients associated with an intra-coded video frame have been encoded in an adaptation parameter set data structure, in response to determining that the second filter coefficients have been encoded in the adaptation parameter set data structure, selecting the second filter coefficients to be encoded in the first video frame, and in response to determining that the second filter coefficients have not been encoded in the adaptation parameter set data structure, encoding the first video frame with third filter coefficients stored in a decoded video frame buffer.

In Example 33, the subject matter of Examples 28-32 can optionally include that the video filter is a luminance adaptive loop filter, and, in response to determining that the first video frame is not a critical video frame with respect to the previous video frame and determining to turn off a chrominance adaptive loop filter generating the luminance adaptive loop filter, identifying a filter index corresponding to the luminance adaptive loop filter, and encoding the first video frame with the filter index.

In Example 34, the subject matter of Examples 28-33 can optionally include that the video filter is a luminance adaptive loop filter, and, in response to determining that the first video frame is not a critical video frame with respect to the previous video frame and determining to turn on a chrominance adaptive loop filter generating the chrominance adaptive loop filter, the luminance adaptive loop filter, and a cross-component adaptive loop filter, identifying a first filter index corresponding to the luminance adaptive loop filter, a second filter index corresponding to the chrominance adaptive loop filter, and a third filter index corresponding to the cross-component adaptive loop filter, and encoding the first video frame with the first filter index, the second filter index, and the third filter index.

In Example 35, the subject matter of Examples 28-34 can optionally include measuring a temporal correlation difference between the first video frame and the previous video frame, and in response to determining that the temporal correlation difference satisfies a threshold, identifying the first video frame as an intra-coded video frame, the critical video frame representative of a critical video frame with respect to the previous video frame.

In Example 36, the subject matter of Examples 28-35 can optionally include that the threshold is a first threshold, and, in response to determining that the temporal correlation difference does not satisfy the threshold determining a distance of the first video frame with respect to the prior video frame, in response to determining that the distance does not satisfy a second threshold, identifying the first video frame as a predicted video frame, the predicted video frame to be encoded with the second pixel data, and in response to determining that the distance satisfies the second threshold, identifying the first video frame as the critical video frame.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry instructions; and
   at least one programmable circuit to be programmed based on the instructions to:
   identify a first video frame as a critical video frame with respect to a previous video frame;
   determine whether a latency associated with generation of filter coefficients of a video filter based on first pixel data of the first video frame satisfies a threshold;
   based on a determination that the latency does not satisfy the threshold, generate the filter coefficients of the video filter based on the first pixel data of the first video frame;
   based on a determination that the latency satisfies the threshold, generate the filter coefficients of the video filter based on second pixel data of a previous critical video frame; and
   encode the first video frame with the filter coefficients.

2. The apparatus of claim 1, wherein one or more of the at least one programmable circuit is to restrict generation of video filters to be based on critical video frames.

3. The apparatus of claim 1, wherein one or more of the at least one programmable circuit is to:
   select one or more types of the video filter to be applied to the first video frame;
   identify a filter index corresponding to respective ones of the one or more types of the video filter;
   encode the first video frame with the filter index; and
   output the encoded first video frame.

4. The apparatus of claim 1, wherein the filter coefficients are first filter coefficients, and one or more of the at least one programmable circuit is to, based on a determination that a second video frame is not the critical video frame with respect to the previous video frame:
   determine whether second filter coefficients associated with the previous critical video frame have been encoded in an adaptation parameter set data structure;
   based on a determination that the second filter coefficients have been encoded in the adaptation parameter set data structure, select the second filter coefficients to be encoded in the second video frame; and
   based on a determination that the second filter coefficients have not been encoded in the adaptation parameter set data structure, encode the second video frame with third filter coefficients stored in a decoded video frame buffer.

5. The apparatus of claim 1, wherein one or more of the at least one programmable circuit is to, based on a determination that a second video frame is not the critical video frame with respect to the previous video frame and a determination to turn off a chrominance adaptive loop filter:
   generate a luminance adaptive loop filter;
   identify a filter index corresponding to the luminance adaptive loop filter; and
   encode the second video frame with the filter index.

6. The apparatus of claim 1, wherein one or more of the at least one programmable circuit is to, based on a determination that a second video frame is not the critical video frame with respect to the previous video frame and a determination to turn on a chrominance adaptive loop filter:
   generate the chrominance adaptive loop filter, a luminance adaptive loop filter, and a cross-component adaptive loop filter;
   identify a first filter index corresponding to the luminance adaptive loop filter, a second filter index corresponding to the chrominance adaptive loop filter, and a third filter index corresponding to the cross-component adaptive loop filter; and
   encode the second video frame with the first filter index, the second filter index, and the third filter index.

7. The apparatus of claim 1, wherein one or more of the the at least one programmable circuit is to:
   measure a temporal correlation difference between the first video frame and the previous video frame; and
   identify the first video frame as the critical video frame based on the temporal correlation difference.

8. The apparatus of claim 7, wherein the threshold is a first threshold, and one or more of the at least one programmable circuit is to, based on a determination that the temporal correlation difference does not satisfy a second threshold:
   determine a distance of the first video frame with respect to the previous video frame; and
   identify the first video frame as the critical video frame based on the distance.

9. An apparatus comprising:
   means for identifying a first video frame as a critical video frame with respect to a previous video frame, the means for identifying to:
   measure a temporal correlation difference between the first video frame and the previous video frame; and
   identify the first video frame as the critical video frame based on the temporal correlation difference satisfying a threshold;
   means for generating filter coefficients of a video filter based on first pixel data of the first video frame or second pixel data of a previous critical video frame; and
   means for encoding the first video frame with the filter coefficients.

10. The apparatus of claim 9, wherein the means for generating is to restrict generation of video filters to be based on critical video frames.

11. The apparatus of claim 9, including:
    means for determining whether a latency associated with generation of the filter coefficients based on the first pixel data of the first video frame satisfies a threshold; and
    the means for generating to:
    based on a determination that the latency does not satisfy the threshold, generate the filter coefficients based on the first pixel data; and
    based on a determination that the latency satisfies the threshold, generate the filter coefficients based on the second pixel data.

12. The apparatus of claim 9, including:
    means for selecting one or more types of the video filter to be applied to the first video frame; and
    the means for encoding to:
    identify a filter index corresponding to respective ones of the one or more types of the video filter;
    encode the first video frame with the filter index; and
    output the encoded first video frame.

13. The apparatus of claim 9, wherein the filter coefficients are first filter coefficients, and including:
    means for selecting to, based on a determination that a second video frame is not the critical video frame with respect to the previous video frame:
    determine whether second filter coefficients associated with the previous critical video frame have been encoded in an adaptation parameter set data structure; and based on a determination that the second filter coefficients have been encoded in the adaptation parameter set data structure, select the second filter coefficients to be encoded in the second video frame; and the means for encoding to, based on a determination that the second filter coefficients have not been encoded in the adaptation parameter set data structure, encode the second video frame with third filter coefficients stored in a decoded video frame buffer.

14. The apparatus of claim 9, wherein, based on a determination that a second video frame is not the critical video frame with respect to the previous video frame and a determination to turn off a chrominance adaptive loop filter:

the means for generating is to generate a luminance adaptive loop filter; and the means for encoding is to:

identify a filter index corresponding to the luminance adaptive loop filter; and encode the second video frame with the filter index.

15. The apparatus of claim 9, wherein, based on a determination that a second video frame is not the critical video frame with respect to the previous video frame and a determination to turn on a chrominance adaptive loop filter:

the means for generating is to generate the chrominance adaptive loop filter, a luminance adaptive loop filter, and a cross-component adaptive loop filter; and the means for encoding is to:

identify a first filter index corresponding to the luminance adaptive loop filter, a second filter index corresponding to the chrominance adaptive loop filter, and a third filter index corresponding to the cross-component adaptive loop filter; and encode the second video frame with the first filter index, the second filter index, and the third filter index.

16. The apparatus of claim 9, wherein the threshold is a first threshold, and, based on a determination that the temporal correlation difference does not satisfy the threshold, the means for identifying is to:

determine a distance of the first video frame with respect to the previous video frame; and based on a determination that the distance satisfies a second threshold, identify the first video frame as the critical video frame.

17. At least one non-transitory computer readable storage medium comprising instructions to cause at least one programmable circuit to at least:

determine a first video frame is not a critical video frame; and based on a determination to turn on a chrominance adaptive loop filter:

generate the chrominance adaptive loop filter, a luminance adaptive loop filter, and a cross-component adaptive loop filter;

identify a first filter index corresponding to the luminance adaptive loop filter, a second filter index corresponding to the chrominance adaptive loop filter, and a third filter index corresponding to the cross-component adaptive loop filter; and encode the first video frame with the first filter index, the second filter index, and the third filter index.

18. The at least one non-transitory computer readable storage medium of claim 17, wherein the instructions are to cause one or more of the at least one programmable circuit to limit generation of video to be based on critical video frames.

19. The at least one non-transitory computer readable storage medium of claim 17, wherein the instructions are to cause one or more of the at least one programmable circuit to:

identify a second video frame as the critical video frame;

determine whether a latency associated with generating filter coefficients of a video filter based on first pixel data of the second video frame satisfies a threshold;

based on determining that the latency does not satisfy the threshold, generate the filter coefficients based on the first pixel data; and based on determining that the latency satisfies the threshold, generate the filter coefficients based on second pixel data of a previous critical video frame.

20. The at least one non-transitory computer readable storage medium of claim 19, wherein the instructions are to cause one or more of the at least one programmable circuit to:

select one or more types of the video filter to be applied to the second video frame;

identify a filter index corresponding to respective ones of the one or more types of the video filter;

encode the second video frame with the filter index; and output the encoded second video frame.

21. The at least one non-transitory computer readable storage medium of claim 17, wherein the instructions are to cause one or more of the at least one programmable circuit to:

determine whether first filter coefficients associated with an intra-coded video frame have been encoded in an adaptation parameter set data structure;

based on a determination that the first filter coefficients have been encoded in the adaptation parameter set data structure, select the first filter coefficients to be encoded in the first video frame; and based on a determination that the first filter coefficients have not been encoded in the adaptation parameter set data structure, encode the first video frame with second filter coefficients stored in a decoded video frame buffer.

22. The at least one non-transitory computer readable storage medium of claim 17, wherein the instructions are to cause one or more of the at least one programmable circuit to, based on a determination to turn off the chrominance adaptive loop filter:

generate the luminance adaptive loop filter;

identify the first filter index corresponding to the luminance adaptive loop filter; and encode the first video frame with the first filter index.

* * * * *